US011500143B2

(12) United States Patent
Danziger

(10) Patent No.: US 11,500,143 B2
(45) Date of Patent: Nov. 15, 2022

(54) AUGMENTED REALITY IMAGING SYSTEM

(71) Applicant: LUMUS LTD., Ness Ziona (IL)

(72) Inventor: Yochay Danziger, Rishon Lezion (IL)

(73) Assignee: LUMUS LTD., Nessziona (IL)

( * ) Notice: Subject to any disclaimer, the term of this patent is extended or adjusted under 35 U.S.C. 154(b) by 505 days.

(21) Appl. No.: 16/480,329

(22) PCT Filed: Mar. 15, 2017

(86) PCT No.: PCT/IL2017/050331
§ 371 (c)(1),
(2) Date: Jul. 24, 2019

(87) PCT Pub. No.: WO2018/138714
PCT Pub. Date: Aug. 2, 2019

(65) Prior Publication Data
US 2019/0377122 A1 Dec. 12, 2019

Related U.S. Application Data

(60) Provisional application No. 62/451,695, filed on Jan. 28, 2017.

(51) Int. Cl.
*F21V 8/00* (2006.01)
*G02B 3/10* (2006.01)
(Continued)

(52) U.S. Cl.
CPC .............. *G02B 6/0033* (2013.01); *G02B 3/10* (2013.01); *G02B 27/0172* (2013.01); *G02C 7/061* (2013.01); *G02B 2027/0185* (2013.01)

(58) Field of Classification Search
CPC ........ G02B 27/0172; G02B 2027/0178; G02B 2027/0123; G02B 27/017; G02B 2027/011; G02F 1/294
See application file for complete search history.

(56) References Cited

U.S. PATENT DOCUMENTS 3,737,212 A 6/1973 Antonson et al.
3,807,849 A 4/1974 Lobb
(Continued)

FOREIGN PATENT DOCUMENTS

CN 102445756 A * 5/2012 ........... G02B 27/017
CN 105531716 A * 4/2016 ......... G02B 27/0093
(Continued)

OTHER PUBLICATIONS

International Commission on Non-Ionizing Radiation Protection "ICNIRP Guidelines for Limiting Exposure to Time-Varying Electric, Magnetic and Electromagnetic Fields (Up To 300 Ghz)" Published In: Health Physics 74 (4):494-522; 1998.
(Continued)

*Primary Examiner* — Christopher Stanford
(74) *Attorney, Agent, or Firm* — Mark M. Friedman

(57) ABSTRACT

An optical system is presented for use in an augmented reality imaging system. The optical system comprises a light directing device, and a projecting optical device. The light directing device is configured for directing input light, including light indicative of an augmented image to be projected and input light indicative of a real image of an external scene, to propagate to an imaging plane. The projecting optical device has a fixed field of view and has a plurality of different focal parameters at different regions thereof corresponding to different vision zones within the field of view. The projecting optical device is configured to affect propagation of at least one of light indicative of the augmented image and light indicative of the real image, such that, for each of the different regions, interaction of a part of the light indicative of the augmented image and a part of the light indicative of the real image with said region of projecting optical device directs the parts of augmented image light and real image light along a substantially common output
(Continued)

propagation path, corresponding to the focal parameter of said region.

7 Claims, 9 Drawing Sheets

(51) Int. Cl.
*G02B 27/01* (2006.01)
*G02C 7/06* (2006.01)

(56) References Cited

U.S. PATENT DOCUMENTS

| | | | |
|---|---|---|---|
| 3,940,204 A | 2/1976 | Withrington |
| 4,084,883 A | 4/1978 | Eastman et al. |
| 4,309,070 A | 1/1982 | St. Leger Searle |
| 4,516,828 A | 5/1985 | Steele |
| 4,613,216 A | 9/1986 | Herbec et al. |
| 4,711,512 A | 12/1987 | Upatnieks |
| 4,720,189 A | 1/1988 | Heynen et al. |
| 4,775,217 A | 10/1988 | Ellis |
| 4,798,448 A | 1/1989 | Van Raalte |
| 4,805,988 A | 2/1989 | Dones |
| 5,076,664 A | 12/1991 | Migozzi |
| 5,096,520 A | 3/1992 | Faris |
| 5,208,800 A | 5/1993 | Isobe et al. |
| 5,231,642 A | 7/1993 | Scifres et al. |
| 5,235,589 A | 8/1993 | Yokomori et al. |
| 5,301,067 A | 4/1994 | Bleier et al. |
| 5,353,134 A | 10/1994 | Michel et al. |
| 5,369,415 A | 11/1994 | Richard et al. |
| 5,430,505 A | 7/1995 | Katz |
| 5,453,877 A | 9/1995 | Gerbe et al. |
| 5,543,877 A | 8/1996 | Takashi et al. |
| 5,619,601 A | 4/1997 | Akashi et al. |
| 5,712,694 A | 1/1998 | Taira et al. |
| 5,724,163 A | 3/1998 | David |
| 5,896,232 A | 4/1999 | Budd et al. |
| 5,966,223 A | 10/1999 | Yaakov et al. |
| 5,982,536 A | 11/1999 | Swan |
| 5,999,836 A | 12/1999 | Nelson |
| 6,052,500 A | 4/2000 | Takano et al. |
| 6,091,548 A | 7/2000 | Chen |
| 6,144,347 A | 11/2000 | Mizoguchi et al. |
| 6,154,321 A | 11/2000 | Melville et al. |
| 6,222,676 B1 | 4/2001 | Togino et al. |
| 6,239,092 B1 | 5/2001 | Papasso et al. |
| 6,264,328 B1 | 7/2001 | Williams |
| 6,324,330 B1 | 11/2001 | Stites |
| 6,349,001 B1 | 2/2002 | Spitzer |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,421,031 B1 | 7/2002 | Ronzani et al. |
| 6,480,174 B1 | 11/2002 | Kaufmass et al. |
| 6,509,982 B2 | 1/2003 | Steiner |
| 6,542,307 B2 | 4/2003 | Gleckman |
| 6,556,282 B2 | 4/2003 | Jamieson et al. |
| 6,580,529 B1 | 4/2003 | Amitai et al. |
| 6,577,411 B1 | 6/2003 | David |
| 6,671,100 B2 | 12/2003 | McRuer |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,926,429 B2 | 8/2005 | Barlow et al. |
| 6,927,694 B1 | 9/2005 | Smith et al. |
| 7,016,113 B2 | 3/2006 | Choi et al. |
| 7,199,934 B2 | 4/2007 | Yamasaki |
| 7,205,960 B2 | 4/2007 | David |
| 7,245,273 B2 | 7/2007 | Eberl et al. |
| 7,307,791 B2 | 12/2007 | Li et al. |
| 7,355,795 B1 | 4/2008 | Yamazaki et al. |
| 7,430,355 B2 | 9/2008 | Heikenfeld et al. |
| 7,577,326 B2 | 8/2009 | Amitai |
| 7,643,214 B2 | 1/2010 | Amitai |
| 7,667,962 B2 | 2/2010 | Mullen |
| 7,724,442 B2 | 5/2010 | Amitai |
| 7,751,122 B2 | 7/2010 | Amitai |
| 7,777,960 B2 | 8/2010 | Freeman |
| 7,857,444 B2 * | 12/2010 | Moliton ............... G02C 7/02 351/158 |
| 7,949,252 B1 | 5/2011 | Georgiev |
| 8,000,020 B2 | 8/2011 | Amitai |
| 8,004,765 B2 | 8/2011 | Amitai |
| 8,098,439 B2 | 1/2012 | Amitai et al. |
| 8,187,481 B1 | 5/2012 | Hobbs |
| 8,405,573 B2 | 3/2013 | Lapidot et al. |
| 8,467,133 B2 | 6/2013 | Miller |
| 8,611,015 B2 | 12/2013 | Wheeler et al. |
| 8,665,178 B1 | 3/2014 | Wang |
| 8,810,914 B2 | 8/2014 | Amitai |
| 8,861,081 B2 | 10/2014 | Mansharof et al. |
| 8,873,150 B2 | 10/2014 | Amitai |
| 8,902,503 B2 | 12/2014 | Amitai et al. |
| 8,913,865 B1 | 12/2014 | Bennett |
| 8,917,453 B2 | 12/2014 | Bohn |
| 8,998,414 B2 | 4/2015 | Bohn |
| 9,069,180 B2 | 6/2015 | Amitai |
| 9,104,036 B2 | 8/2015 | Amitai et al. |
| 9,207,457 B2 | 12/2015 | Amitai |
| 9,248,616 B2 | 2/2016 | Amitai |
| 9,279,986 B2 | 3/2016 | Amitai |
| 9,316,832 B2 | 4/2016 | Levin et al. |
| 9,328,182 B2 | 5/2016 | Burmaster et al. |
| 9,348,143 B2 * | 5/2016 | Gao ............... G02B 27/0172 |
| 9,417,453 B2 | 8/2016 | Amitai |
| 9,448,408 B2 | 9/2016 | Amitai et al. |
| 9,488,840 B2 | 11/2016 | Mansharof et al. |
| 9,500,869 B2 | 11/2016 | Amitai |
| 9,513,479 B2 * | 12/2016 | Komatsu ............ G02B 27/0172 |
| 9,513,481 B2 | 12/2016 | Amitai |
| 9,551,874 B2 | 1/2017 | Amitai |
| 9,551,880 B2 | 1/2017 | Amitai |
| 9,568,738 B2 | 2/2017 | Mansharof et al. |
| 9,625,723 B2 * | 4/2017 | Lou ................. G06F 3/013 |
| 9,664,910 B2 | 5/2017 | Mansharof et al. |
| 9,740,006 B2 * | 8/2017 | Gao ............... G02B 27/0172 |
| 9,740,013 B2 | 8/2017 | Amitai et al. |
| 9,804,396 B2 | 10/2017 | Amitai |
| 9,910,283 B2 | 3/2018 | Amitai |
| 9,927,614 B2 * | 3/2018 | Vallius ............. G02B 27/4272 |
| 9,977,244 B2 | 5/2018 | Amitai |
| 10,007,115 B2 * | 6/2018 | Greenhalgh ........ G02B 27/0081 |
| 10,048,499 B2 | 8/2018 | Amitai |
| 10,073,264 B2 | 9/2018 | Amitai |
| 10,126,568 B2 * | 11/2018 | Rousseau ............ G02C 7/086 |
| 10,133,070 B2 | 11/2018 | Danziger |
| 10,139,636 B2 * | 11/2018 | Lebrun ............. G02B 27/017 |
| 10,198,865 B2 | 2/2019 | Kezele et al. |
| 10,209,517 B2 | 2/2019 | Popovich et al. |
| 10,222,535 B2 | 3/2019 | Remhof et al. |
| 10,247,962 B2 * | 4/2019 | Rousseau ............ G02C 7/086 |
| 10,261,321 B2 | 4/2019 | Amitai |
| 10,302,835 B2 | 5/2019 | Danziger |
| 10,326,983 B2 * | 6/2019 | Hua ................. G06V 20/20 |
| 10,409,064 B2 * | 9/2019 | Lee ............... G02B 27/283 |
| 10,437,031 B2 | 10/2019 | Danziger et al. |
| 10,506,220 B2 | 10/2019 | Danziger |
| 10,473,841 B2 | 11/2019 | Danziger |
| 10,481,319 B2 | 11/2019 | Danziger et al. |
| 10,852,549 B2 * | 12/2020 | Rousseau .......... G02B 27/0172 |
| 11,175,518 B2 * | 11/2021 | Zimanyi ............. G06F 30/20 |
| 11,202,563 B2 * | 12/2021 | Zimanyi ............ G02B 27/0172 |
| 2002/0015233 A1 | 2/2002 | Park |
| 2002/0191297 A1 | 12/2002 | Gleckman et al. |
| 2003/0020006 A1 | 1/2003 | Janeczko et al. |
| 2003/0063042 A1 | 4/2003 | Friesem et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0032660 A1 | 2/2004 | Amitai |

(56) References Cited

U.S. PATENT DOCUMENTS

| | | |
|---|---|---|
| 2004/0033528 A1 | 2/2004 | Amitai |
| 2004/0137189 A1 | 7/2004 | Tellini et al. |
| 2005/0018308 A1 | 1/2005 | Cassarly et al. |
| 2005/0024849 A1 | 2/2005 | Parker et al. |
| 2005/0073577 A1 | 4/2005 | Sudo |
| 2005/0078388 A1 | 4/2005 | Amitai |
| 2005/0083592 A1 | 4/2005 | Amitai |
| 2005/0084210 A1 | 4/2005 | Cha |
| 2005/0174658 A1 | 8/2005 | Long et al. |
| 2005/0180687 A1 | 8/2005 | Amitai et al. |
| 2005/0225866 A1 | 10/2005 | Abu Ageel et al. |
| 2005/0248852 A1 | 11/2005 | Yamasaki |
| 2006/0052146 A1 | 3/2006 | Ou |
| 2006/0061555 A1 | 3/2006 | Mullen |
| 2006/0103590 A1 | 5/2006 | Divon |
| 2006/0146518 A1 | 7/2006 | Dubin |
| 2006/0153518 A1 | 7/2006 | Abu Ageel |
| 2007/0035706 A1 | 2/2007 | Margulis |
| 2007/0070859 A1 | 3/2007 | Hirayama |
| 2007/0091445 A1 | 4/2007 | Amitai |
| 2007/0097513 A1 | 5/2007 | Amitai |
| 2007/0155277 A1 | 7/2007 | Amitai |
| 2007/0165192 A1 | 7/2007 | Prior |
| 2007/0273611 A1 | 11/2007 | Torch |
| 2007/0285663 A1 | 12/2007 | Hewitt et al. |
| 2008/0025667 A1 | 1/2008 | Amitai |
| 2008/0106775 A1 | 5/2008 | Amitai et al. |
| 2008/0151375 A1 | 6/2008 | Lin |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2010/0171680 A1 | 7/2010 | Lapidot et al. |
| 2010/0201953 A1 | 8/2010 | Freeman et al. |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2010/0302276 A1 | 12/2010 | Levola |
| 2011/0096566 A1 | 4/2011 | Tsai et al. |
| 2011/0010988 A1 | 5/2011 | Nummela |
| 2011/0109880 A1 | 5/2011 | Nummela |
| 2011/0242661 A1 | 10/2011 | Simmonds |
| 2012/0062998 A1 | 3/2012 | Schultz et al. |
| 2012/0120498 A1* | 5/2012 | Harrison ............ G02B 27/0093 359/630 |
| 2012/0179369 A1 | 7/2012 | Lapidot et al. |
| 2012/0194781 A1 | 8/2012 | Agurok |
| 2012/0218301 A1 | 8/2012 | Miller |
| 2013/0021226 A1* | 1/2013 | Bell .................... G02B 3/0006 345/8 |
| 2013/0007704 A1 | 3/2013 | Bohn |
| 2013/0120224 A1 | 5/2013 | Cajigas et al. |
| 2013/0135749 A1 | 5/2013 | Akutsu et al. |
| 2013/0208362 A1 | 8/2013 | Bohn et al. |
| 2013/0229717 A1 | 9/2013 | Amitai |
| 2013/0257832 A1 | 10/2013 | Hammond |
| 2013/0276960 A1 | 10/2013 | Amitai |
| 2013/0279017 A1 | 10/2013 | Amitai |
| 2013/0334504 A1 | 12/2013 | Thompson et al. |
| 2014/0003762 A1 | 1/2014 | Macnamara |
| 2014/0016051 A1 | 1/2014 | Kroll |
| 2014/0104665 A1 | 4/2014 | Popovitch |
| 2014/0014065 A1 | 5/2014 | Brown et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0140654 A1 | 5/2014 | Brown et al. |
| 2014/0019801 A1 | 7/2014 | Lamb et al. |
| 2014/0240834 A1 | 8/2014 | Mason |
| 2015/0016777 A1 | 1/2015 | Abovitz et al. |
| 2015/0081313 A1 | 3/2015 | Boross et al. |
| 2015/0103306 A1 | 4/2015 | Kaji |
| 2015/0138451 A1 | 5/2015 | Amitai |
| 2015/0182348 A1 | 7/2015 | Siegal et al. |
| 2015/0185475 A1 | 7/2015 | Saarikko et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0207990 A1 | 7/2015 | Ford |
| 2015/0219834 A1 | 8/2015 | Nichol et al. |
| 2015/0260992 A1 | 9/2015 | Luttmann et al. |
| 2015/0277127 A1 | 10/2015 | Amitai |
| 2015/0289762 A1 | 10/2015 | Popovich et al. |
| 2015/0293360 A1 | 10/2015 | Amitai |
| 2015/0355481 A1 | 12/2015 | Hilkes et al. |
| 2016/0109712 A1 | 4/2016 | Harrison et al. |
| 2016/0116743 A1 | 4/2016 | Amitai |
| 2016/0161740 A1 | 6/2016 | Bar-Zeev et al. |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0189432 A1 | 6/2016 | Bar-Zeev et al. |
| 2016/0020965 A1 | 7/2016 | Popovich et al. |
| 2016/0198949 A1* | 7/2016 | Spitzer ............... G02B 27/0172 351/204 |
| 2016/0209648 A1 | 7/2016 | Haddick et al. |
| 2016/0209657 A1 | 7/2016 | Popovich et al. |
| 2016/0266387 A1 | 9/2016 | Tekolste et al. |
| 2016/0314564 A1 | 10/2016 | Jones |
| 2016/0327906 A1 | 11/2016 | Futterer |
| 2016/0341964 A1 | 11/2016 | Amitai |
| 2016/0349518 A1 | 12/2016 | Amitai et al. |
| 2017/0003504 A1 | 1/2017 | Vallius |
| 2017/0011555 A1 | 1/2017 | Li et al. |
| 2017/0017095 A1 | 1/2017 | Fricker et al. |
| 2017/0045744 A1 | 2/2017 | Amitai |
| 2017/0052376 A1 | 2/2017 | Amitai |
| 2017/0052377 A1 | 2/2017 | Amitai |
| 2017/0122725 A1 | 5/2017 | Yeoh |
| 2017/0276947 A1 | 9/2017 | Yokoyama |
| 2017/0299860 A1 | 10/2017 | Wall |
| 2017/0336636 A1 | 11/2017 | Amitai et al. |
| 2017/0343822 A1 | 11/2017 | Border et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0120559 A1 | 5/2018 | Yeoh et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0086674 A1 | 3/2019 | Sinay et al. |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |

(56) References Cited

U.S. PATENT DOCUMENTS

| | | |
|---|---|---|
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0192089 A1 | 6/2020 | Haddick et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292818 A1 | 9/2020 | Amitai |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0149204 A1 | 5/2021 | Amitai |
| 2021/0157150 A1 | 5/2021 | Amitai |
| 2021/0165231 A1 | 6/2021 | Gelberg et al. |

FOREIGN PATENT DOCUMENTS

| | | | |
|---|---|---|---|
| DE | 1422172 | 11/1970 | |
| DE | 19725262 | 12/1998 | |
| DE | 102013106392 | 12/2014 | |
| EP | 0365406 | 4/1990 | |
| EP | 0380035 | 8/1990 | |
| EP | 0543718 | 5/1993 | |
| EP | 0566004 | 10/1993 | |
| EP | 1158336 | 11/2001 | |
| EP | 1180711 | 2/2002 | |
| EP | 1326102 | 7/2003 | |
| EP | 0399865 | 1/2004 | |
| EP | 1385023 | 1/2004 | |
| EP | 1485747 | 12/2004 | |
| EP | 1562066 | 8/2005 | |
| EP | 1691547 | 8/2006 | |
| EP | 0770818 | 4/2007 | |
| EP | 1779159 | 5/2007 | |
| FR | 2496905 | 6/1982 | |
| FR | 2638242 | 4/1990 | |
| FR | 2721872 | 1/1996 | |
| GB | 2220081 | 12/1989 | |
| GB | 2272980 | 6/1994 | |
| GB | 2278222 | 11/1994 | |
| GB | 2278888 | 12/1994 | |
| IL | 183637 | 6/2013 | |
| JP | 08-313843 | 11/1996 | |
| JP | 2002350771 | 12/2002 | |
| JP | 2002368762 | 12/2002 | |
| JP | 2003520984 | 7/2003 | |
| JP | 2004233909 | 8/2004 | |
| JP | 2010044172 | 2/2010 | |
| JP | 2012-37761 | 2/2012 | |
| WO | 9510106 | 4/1995 | |
| WO | 9815868 | 4/1998 | |
| WO | 9952002 | 10/1999 | |
| WO | 0004407 | 1/2000 | |
| WO | 0063738 | 10/2000 | |
| WO | 0195025 | 12/2001 | |
| WO | 0195027 | 12/2001 | |
| WO | 2082168 | 10/2002 | |
| WO | 03058320 | 7/2003 | |
| WO | 03081320 | 10/2003 | |
| WO | 2004109349 | 12/2004 | |
| WO | 2004109349 A2 | 12/2004 | |
| WO | 2008023367 | 2/2008 | |
| WO | 2008023367 A1 | 2/2008 | |
| WO | WO-2010123934 A1 * | 10/2010 | ........... G02B 17/006 |
| WO | 2012008966 | 1/2012 | |
| WO | 2012008966 A1 | 1/2012 | |
| WO | 2013065656 | 5/2013 | |
| WO | 2013065656 A1 | 5/2013 | |
| WO | 2013112705 | 8/2013 | |
| WO | 2013112705 A1 | 8/2013 | |
| WO | 2015012280 | 1/2015 | |
| WO | 2015081313 | 6/2015 | |
| WO | WO-2015184409 A1 * | 12/2015 | ......... G02B 26/0825 |
| WO | 16075689 A1 | 5/2016 | |
| WO | 16103251 A1 | 6/2016 | |
| WO | 2016103251 | 6/2016 | |
| WO | 2017199232 A1 | 11/2017 | |

OTHER PUBLICATIONS

Jan van de Kraats et al. "Directional and nondirectional spectral reflection from the human fovea" journal of biomedical optics 13(2), 024010 Mar./Apr. 2008.

Mukawa et al. A full-color eyewear display using planar waveguides with reflection volume holograms. Journal of The Society for Information Display—J Soc Inf Disp. Mar. 17, 2009. 10.1689/JSID17.3.185-187 Mar. 31, 2009 (Mar. 31, 2009) pp. 285-287.

* cited by examiner

Along time ago

In a galaxy far,

Far away ....

*A long time ago in a galaxy far, far away....*

AUGMENTED REALITY IMAGING SYSTEM

TECHNOLOGICAL FIELD AND BACKGROUND

The present invention is generally in the field of augmented reality techniques, and relates to an optical system and method for projecting light in augmented reality systems. In particular, such optical system may be incorporated within a see-through near-eye display, or head-mounted display (e.g. helmet- or eyeglasses-mounted display), which has the capability of reflecting projected images as well as allowing the user to see through it.

A near-eye display is a wearable device that creates a display in front of a field of vision of a user. Near-eye displays include such main components as an image generator and an optical combiner. The image generator provides digitally reproduced images, e.g. utilizing a spatial light modulator (SLM) or similar devices typically including a pixel matrix which is imaged to infinity by a collimating lens and is transmitted into the eye of the viewer by reflecting or partially reflecting surface(s) acting as a combiner for, respectively, non-see-through and see-through applications. For an augmented reality display, the optical combiner works to combine light from the external world and from the image generator into a single presentation of visual data to the imaging optics and eyes.

A near-eye display presents image information to a viewer within viewing pupils (also referred to as "eyeboxes"), which when aligned with the pupils of the eyes of the viewer, produces virtual images within the field of view of the viewer. Combiners, or waveguides, of near-eye displays convey image information toward the eyes of a viewer from positions outside the field of view of the viewer.

Various example of such waveguides suitable for use in augmented reality systems are described in the following patent publications, all assigned to the assignee of the present application: U.S. Pat. Nos. 8,098,439; 7,643,214; 8,000,020; 7,724,442; 8,004,765; 7,577,326; 6,829,095; US2015138451; WO16075689; WO16103251; U.S. Pat. Nos. 9,513,481; 9,551,880; 9,551,874. In such waveguides, light carrying an augmented image is guided by total internal reflection to a partially reflective surface from which it is reflected to a viewer.

GENERAL DESCRIPTION

There is a need in the art for a novel approach for configuring an optical device for use in an augmented reality system. It should be understood that in an augmented reality system, a virtual image is augmented onto the real scene image. Accordingly, in the augmented reality system, implemented in a see-through near-eye display, high-quality images should be concurrently provided for both the real image and virtual/augmented image within the entire field of view of the system, for differently distanced real and virtual objects.

In order to provide comfort to a viewer for observing both the augmented and real images, in many cases either of these images or both are to be modified. It is known to implement electronically controlled dynamic lenses, enabling the user to dynamically control the focus of the image.

The situation is different in a so-called "static" augmented reality system in a see-through near-eye display, namely the system having fixed optical properties such as field of view, optical power/focal parameters' profile within the field of view of the system. The present invention provides for achieving the required comfort by improving the concurrent appearance of both the augmented and real images to a viewer using the so-called static optical system. To this end, the optical system of the invention is configured such as to cause projected light portions indicative of the augmented and real images, respectively, to propagate to the viewer's eyes (image plane) along a common optical path for far distanced objects virtual and real objects and a common optical path for closer distanced virtual and real objects. In this connection, it should be noted that, although in the description below, the invention is exemplified as being used for applying a focal change in upper part and lower part of the field of view of the optical system, the principles of the invention are not limited to this specific example, and the focal change can be applied to any other part(s)/section(s) across the field of view of the system.

In most cases, in the augmented reality systems, nothing needs to be done with the real image of an external scene, i.e. far and close distanced objects are to be presented to a viewer as they are. However, in some cases, the real image projection is to be performed in a way similar to that of a multi-focal lens (e.g. progressive lens), such that both the augmented image and the external world (real image) are focused to infinity in the upper segment of the FOV where the real objects are far and in the lower segment of the FOV where real objects are typically near. This requires modification of light indicative of the real image being projected.

In most cases, the appearance of a virtual image, which is to be properly augmented on the real scene image is to be improved. This is achieved by affecting/modifying convergence (focusing) of light indicative of the augmented image being projected. The convergence of light indicative of the augmented image may be affected prior to this light interaction with a light combining surface, which combines output propagation paths of the augmented-image light and real image light, thus leaving the real-image light unaffected.

In some cases, the system configuration requires that the augmented-image projection be affected just in front of the user's eyes, namely while in the combined projection path of both the augmented-image and real-image light rays. Accordingly, this effect is to be compensated for the real-image appearance.

The present invention provides a novel optical system (at times referred to as image projector) for use in augmented reality system. The image projector of the invention is configured with a fixed field of view (FOV) and fixed profile of optical properties within said FOV, and affects light propagation therethrough such that a virtual focal plane is created, which is slanted/tilted with respect to an optical axis of the image projector.

According to some embodiments of the invention, there is provided an optical system for use in an augmented reality imaging system, the optical system comprising:

a light directing device configured for directing input light, including light indicative of an augmented image being projected and input light indicative of a real image of an external scene, to propagate in a general propagation direction to an imaging plane; and a projecting optical device having a fixed field of view and having a plurality of different focal parameters at different regions thereof corresponding to different vision zones within said field of view, the projecting optical device being configured to affect propagation of at least one of the light indicative of the augmented image, such that, for each of said different regions, interaction of a part of said light indicative of the augmented image and a part of said light indicative of the real image with said region directs the parts of the light indicative of the augmented image and light indicative of the real image along a substantially common output path corresponding to the focal parameter of said region, thereby providing in-focus images in said imaging plane for said parts of light indicative of the augmented image and light indicative of the real image.

It should be understood that when speaking about augmented reality imaging system, such as see-through near-eye display or head-mounted display, the term "imaging plane" actually refers to a so-called eyebox. The latter is a volume of space within which an effectively viewable image is formed by an imaging system, representing a combination of exit pupil size and eye relief distance.

Generally, the light directing device is configured to define at least one light combining surface located in optical paths of the input light indicative of the augmented image and the input light indicative of the real image for reflecting one of these lights and transmitting the other to propagate towards the image plane. In the see-through near eye augmented reality systems, the light combining surface reflects the augmented-image light and transmits the real-image light. In some embodiments, the light directing device includes a light-guiding optical element (LOE) which is transmitting for light from an external source, and is configured to guide light propagation thereinside (augmented-image light) to and from a light output surface. For example, such LOE may be configured to guide light therethrough by total internal reflection from inner major surfaces thereof and output light therefrom by light interaction with one or more partially reflective or diffractive surfaces, each serving as the above-described light combining surface for directing the augmented-image light and real-image light.

The different vision zones are defined by regions of the projecting optical device, such that when the optical system is in use, these regions are aligned with (intersected by) user's line of sight in its different angular orientations, when the user is moving his pupils to observe differently distanced objects. For example, the projecting optical device may define far and near vision regions with different focal parameters/optical power for far and near distanced objects (similar to bi-focal lens), or may have the optical power/focal parameters' profile similar to that of a progressive lens. Thus, generally, these regions of different focal parameters may be implemented as discrete regions or as continuously varying focus across the field of view.

In some embodiments, the projecting optical device comprises an augmented image projecting unit located in an optical path of the input light indicative of the augmented image while propagating towards the light directing device. In this case, the projecting optical device is configured for affecting propagation of the light indicative of the augmented image being projected, while not affecting propagation of the input light indicative of the real image of the scene.

The augmented image projecting unit may comprise at least one lens having the plurality of different focal parameters.

In some other embodiments, the projecting optical device comprises an augmented image projecting unit and a real image projecting unit having the same field of view, and located in a spaced-apart relationship in optical path of light emerging from the light directing device. In other words, in this configuration, the projecting optical device affects the augmented-image light and the real-image light. Each of these projecting units has the plurality of different focal parameters, which may be implemented as discrete regions or as continuously varying focus across the field of view.

The augmented image projecting unit and the real image projecting unit are configured in an opposite symmetric manner, such that the plurality of focal parameters of the real image projecting unit compensate effects of the plurality of different focal parameters of the augmented image projecting unit. The augmented image projecting unit and the real image projecting unit are accommodated (at fixed locations) at opposite sides of the light directing device.

It should be understood that an augmented image projecting unit located at the output of the light directing unit actually interacts with (affects propagation of) both the light indicative of the augmented image and the light indicative of the real image. Therefore, for such embodiments, the term "augmented image projecting unit" is used solely in order to distinguish this unit from a "real image projecting unit" which interacts only with the light indicative of the real image; but the configuration and function of the augmented image projecting unit should be properly understood and interpreted.

Each of such units may comprise at least one lens, where the lenses of these units have similar optical properties (the plurality of different focal parameters) and are located in a spaced-apart substantially parallel planes along a common optical axis while being oriented in the opposite symmetric manner with respect to a plane of the light directing device. As a result, these units apply opposite optical effects to the light passing therethrough.

In any of the above-described embodiments, the projecting optical device comprises at least one lens, having one of the following configurations: a bifocal lens, trifocal lens, continuously changing focal distance lens (progressive lens); which can be; realized as one of: refractive lens, diffractive lens, Fresnel lens or reflecting surface.

In some other embodiments of the invention, the optical system includes a light directing device and an optical projecting device, where each of these devices is a multi-unit assembly/device. More specifically, the light directing device includes an array of at least two light directing units, each being configured as described above, namely guiding augmented-image light towards a light output surface (light combining surface) and transmitting the real-image light to interact with said light output surface; and the light projecting device includes an array of light projecting units. The configuration is such that all these units, i.e. light directing units and light projecting units are located in a spaced-apart relationship along a common axis, such that real-image light successively propagates through (interacts with) all these units. Moreover, each light directing unit is enclosed between two of the light projecting units.

In such multi-unit light directing device, each light directing unit is selectively operated. More specifically, each light directing unit may be operated independently, i.e. may be associated with its own augmented image source; or all of them (or at least some of them) may be associated with a common image source, which is configured to be selectively switchable to direct augmented-image light to one of the light directing units.

Each of the light projecting units is configured (i.e. has optical profile) such that, depending on which one of the light directing units is in operation in an imaging session, the respective light projecting units (i.e. those with which both the augmented-image light and real-image light interact) affect light propagation therethrough such that interaction of the augmented-image light with the respective light projecting units provides a desired effect (focal distance change), while interaction of the real-image light with the respective light projecting units on its way through the system does not induce any focal distance change.

The invention also provides an augmented reality system comprising an augmented image source producing input light indicative of an augmented image to be projected to a viewer, and the above-described optical system. The augmented image source may comprise an image generator and a collimating module, such that the input light received by the light directing device is collimated light indicative of the augmented image to be projected.

According to another broad aspect of the invention, it provides an optical system for use in an augmented reality imaging system, the optical system comprising:

a light-transmitting waveguide configured for receiving input light indicative of an augmented image to be projected, guiding said input light indicative of the augmented image, and coupling said light out of the waveguide to propagate along an output path towards an imaging plane;

a projecting optical device comprising an augmented image projecting unit and a real image projecting unit, each unit having a fixed field of view and a plurality of different focal parameters at different regions thereof corresponding to different vision zones within said field of view, the augmented image projecting unit and the real image projecting unit being located in spaced-apart substantially parallel planes along a common optical axis at opposite sides of the light-transmitting waveguide, and being configured in an opposite symmetric manner with respect to the waveguide, such that said plurality of different focal parameters of the real image projecting unit compensate effects of said plurality of different focal parameters of the augmented image projecting unit, such that interaction of said light indicative of the augmented image and said light indicative of the real image with each of said different regions directs said light indicative of the augmented image and said light indicative of the real image along a substantially common output path, thereby providing in-focus images in said imaging plane for said light indicative of the augmented image and said light indicative of the real image.

According to yet another broad aspect, the present invention provides an optical system for use in an augmented reality imaging system, the optical system comprising:

a light directing device comprising at least one light combining plate configured for directing input light indicative of an augmented image to propagate along an output path in a predetermined direction and directing input light indicative of a real image of a scene propagating along said output path;

a projecting optical device having a fixed field of view and a plurality of different focal parameters at different regions thereof corresponding to different vision zones within said field of view, the projecting optical device comprising an augmented image projecting unit located in an optical path of said input light indicative of the augmented image while propagating towards the light directing device, such that when the optical system is in use, user's line of sight in different angular orientations thereof intersect with said different regions thereby providing in-focus viewing of differently distanced objects.

The invention, in its yet further aspect provides an optical system for use in an augmented reality imaging system, the optical system comprising:

a light directing device comprising at least one light combining plate configured for directing input light indicative of an augmented image to propagate along an output path in a predetermined direction and directing input light indicative of a real image of a scene propagating along said output path;

a projecting optical device having a fixed field of view and a plurality of different focal parameters at different regions thereof corresponding to different vision zones within said field of view, the optical device comprising a real image projecting unit located in an optical path of the light indicative of the real image propagating towards the light directing device, which combines said light indicative of the real image with the light indicative of the augmented image being projected and directs them along a common path to an imaging plane.

According to yet another broad aspect of the invention, it provides an optical system for use in an augmented reality imaging system, the optical system comprising:

a light directing device configured for directing input light, including light indicative of an augmented image to be projected and input light indicative of a real image of an external scene, to propagate to an imaging plane, wherein the light directing device comprises an array of at least two light directing units located in a spaced-apart relationship along an optical axis of the system, the light directing units being configured to selectively involve one of them in an imaging session; and a projecting optical device having a fixed field of view and having a plurality of different focal parameters at different regions thereof corresponding to different vision zones within said field of view, the projecting optical device comprising a plurality of light projecting units located in a spaced-apart relationship along the optical axis of the system such that each of the light directing units is enclosed between a pair of the light projecting units, providing that depending on the selected light directing unit being involved in the imaging session, one or more of the light projecting units are located in an optical path of the light indicative of the real image propagating towards the selected light directing unit, and one or more of the other light projecting units are located at output of the selected light directing unit and are in optical path of both the light indicative of the augmented image and the light indicative of the real image, wherein the light projecting units are configured to induce a compensation optical effect on the light indicative of the real image, such that interaction of a part of the light indicative of the augmented image with one or more regions of said one or more light projecting units, respectively, induces a desired effect of focal distance change on said part of the light indicative of augmented image, while interaction of a part of the light indicative of the real image with one or more regions of said one or more of the other light projecting units induces said compensation optical effect on the part of the light indicative of the real image, thus keeping a focal distance of said part of the light indicative of the real image substantially unchanged.

The invention also provides an optical system for use in an augmented reality imaging system, the optical system comprising:

a light directing device configured for directing input light, including light indicative of an augmented image to be projected and input light indicative of a real image of an external scene, to propagate to an imaging plane;

a projecting optical device having a fixed field of view and having a plurality of different focal parameters at different regions thereof corresponding to different vision zones within said field of view, said projecting optical device comprising a light projecting unit located in optical path of light indicative of the augmented image and light indicative of the real image being output from the light directing device and propagating towards the image plane, said light projecting unit having a predetermined optical power profile defining said different focal parameters configured in accordance with an optical power profile of a personal multi-focal lens of an observer, configured to induce a compensation optical effect on the light indicative of the real image, such that, for each of the regions of the projecting optical device, interaction of a part of the light indicative of the augmented image and light indicative of the real image with said region induces a focal change on the light, said focal change compensating a focal change to be successively induced by the light interaction with an aligned region of the multi-focal lens.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The invention provides a novel optical system for use in an augmented reality imaging system, e.g. see-through near-eye display, or head up display systems. In this connection, reference is first made to FIG. 1 which schematically illustrates the general configuration and operational principles of some known head up display systems utilizing optical systems of the kind to which the present invention relates.

Figures 1, 2A, 2B:
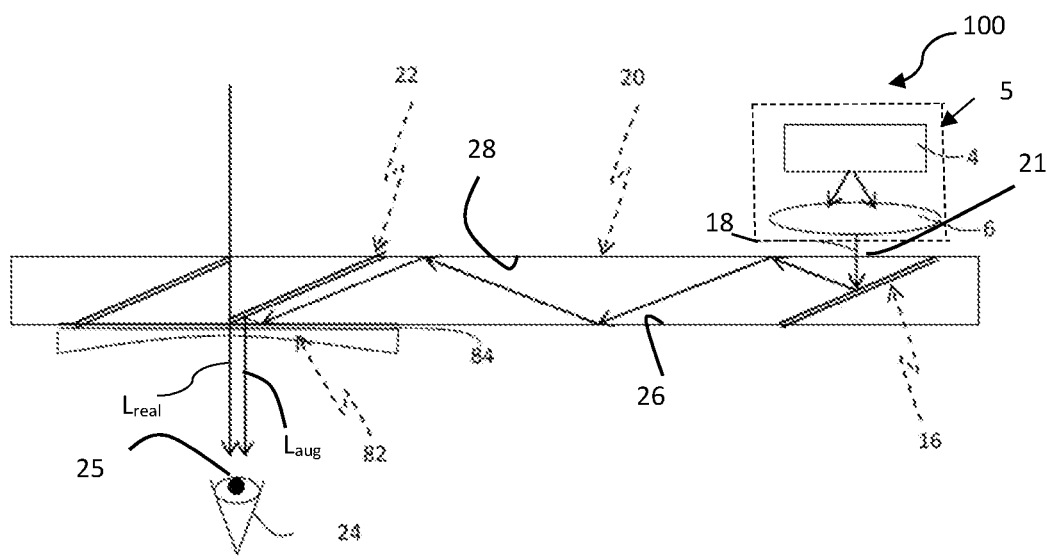
FIG. 1 is a schematic illustration of a light propagation scheme in a waveguide structure used in an head up display system.
FIGS. 2A and 2B exemplify an effect of appearance of an augmented image in, respectively, conventional augmented reality system and that utilizing the optical system of the present invention.

FIG. 1 illustrates a light propagation scheme in an optical system 100 which includes a light-transmitting waveguide 20 (e.g. planar waveguide) configured as a light-guide optical element (LOE) or substrate to guide light therethrough via total internal reflection (TIR). The waveguide 20 has a light input region 21 (which is aligned with an output of an augmented image source 5 (including an image generator 4 and possibly also a collimating module 6), and light directing interfaces 16 and 22 arranged with proper orientation inside the waveguide.

As shown, light waves 18 indicative of the augmented image output from the augmented image source 5 and being properly collimated interact with the reflective interface 16 which reflects these light waves such that they are trapped inside the planar waveguide substrate 20 by total internal reflection. After several reflections from the major lower and upper surfaces 26, 28 of the substrate 20, the trapped light waves reach a partially reflecting surface(s) 22, which couples the light out of the waveguide to propagate in a general propagation direction towards a pupil 25 of viewer's eye 24.

As shown in the figure, it is known to use in the optical device 100 an optical element, such as a lens 82 which focuses augmented-image light $L_{aug}$ and real-image light $L_{real}$ onto a prescribed focal plane and optionally corrects other aberrations of the viewer's eye, e.g. astigmatism. Such optical system is described for example in the above-indicated publications WO 2016/103251 assigned to the assignee of the present application.

Reference is now made to FIGS. 2A and 2B which schematically illustrate an effect which unavoidably occurs in the conventional augmented reality systems, such as system 100 illustrated in FIG. 1, either utilizing a correcting lens 82 or not. FIG. 2A illustrates the virtual/augmented image as being presented to the user/viewer in the above-described system 100 of FIG. 1. As can be seen, the image (text in the present example) as presented to the user appears as a "flat" image in the focal plane (or a conjugate plane) defined by the optical system 100. Accordingly, in such a flat image, all the letters (features) in the text are of the same size and virtual distance, which is due to the constant predetermined optical power of the optical system (e.g. defined by the collimating module).

FIG. 2B illustrates the augmented image of the same text in a different presentation which is desired in some augmented reality applications. As can be seen, the same originally flat image/text appears to be slanted with respect to the optical axis of the system. As a result, the letter's size varies in the virtual image such that the letters (features) corresponding to near distanced objects appear larger than those of farer distanced objects. In the present example, the features' size varies gradually. In other words, larger letters in the augmented text image seem to appear at a closer virtual distance to the user and smaller letters seem to appear at a farther virtual distance from the user, despite of the fact that they all are actually of the same size/scale and angular orientation (with respect to line of sight) in the augmented image generated by the image source. Consequently, the document (augmented image) will be presented in front of the observer in a slanted plane, i.e. not perpendicular to the optical axis defined by the augmented reality imaging system. The appearance of the augmented image is consistent with the focus and the convergence distance, as will be described further below.

As will be described further below, the optical system of the present invention provides for achieving the above effect of the augmented image presentation/projection exemplified in FIG. 2B, while not affecting the presentation/projection of the real image of the scene. It should also be understood that considering the specific not limiting example of FIG. 2B, a change in a focal distance of the virtual object appearance may be in an opposite direction: (i) the larger letters in the augmented text image seem to appear at a farther virtual distance to the user and smaller letters seem to appear at a closer virtual distance from the user, despite of the fact that they all are actually of the same size/scale and angular orientation (with respect to line of sight) in the augmented image generated by the image source; the letters/features may be of different sizes at closer and farther distances, while the induced focal change causes them to appear as if of the same size.

Generally, the optical system of the invention is aimed at improving the concurrent appearance of both the augmented and real images to a viewer. This is achieved in the invention by configuring the optical system such as to cause projected light portions indicative of the augmented and real images, respectively, to propagate to the viewer's eyes (image plane) along common optical path(s). For example, augmented and real images of near distanced objects propagate along a common projection path (i.e. the same convergence/same focal distance), and augmented and real images of far distanced objects propagate along a common projection path.

To this end, the optical system of the invention includes an additional specifically designed projecting optical device. In some embodiments of the invention, the projecting optical device is configured to apply a change of optical power onto the augmented image while avoiding such change in the real image being projected. In some other embodiments, the projecting optical device is configured to apply optical power changes onto both the augmented image and the real image such that, in the image plane, the augmented image is modified while the real image is maintained. In yet further embodiments, the optical system of the invention is configured to affect only the light indicative of the real image. This way both the virtual image and the external world are focused to infinity in the far vision zone (upper FOV) where real objects are far and in the near vision zone (lower FOV) where real objects are typically near.

Figure 3A:
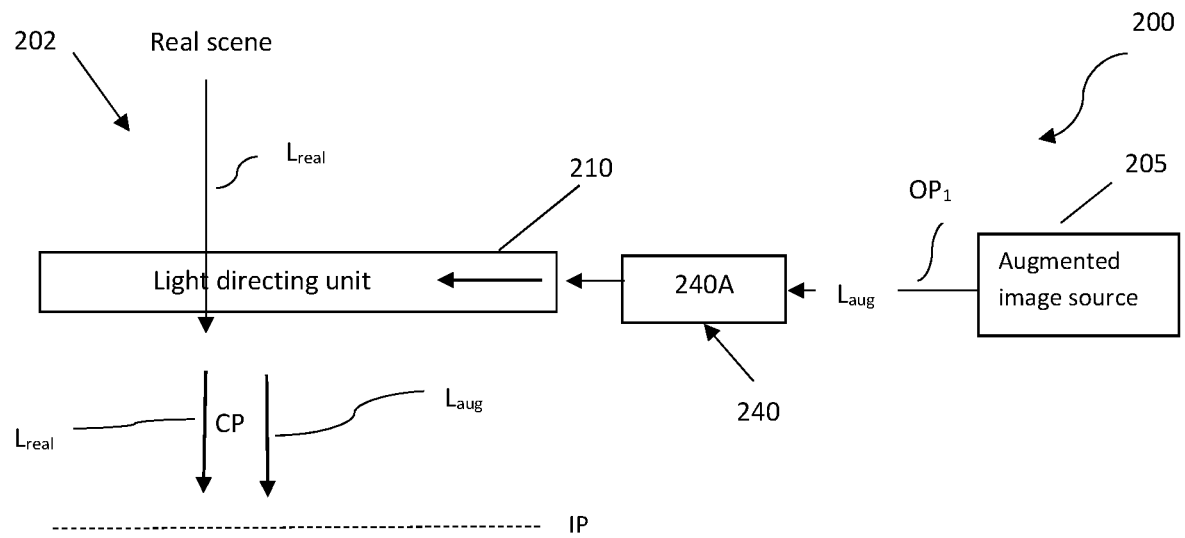
FIGS. 3A and 4A illustrate, by ways of a block diagram, two examples of an augmented reality system utilizing the optical system of different embodiments of the present invention, respectively.
Figure 4A:
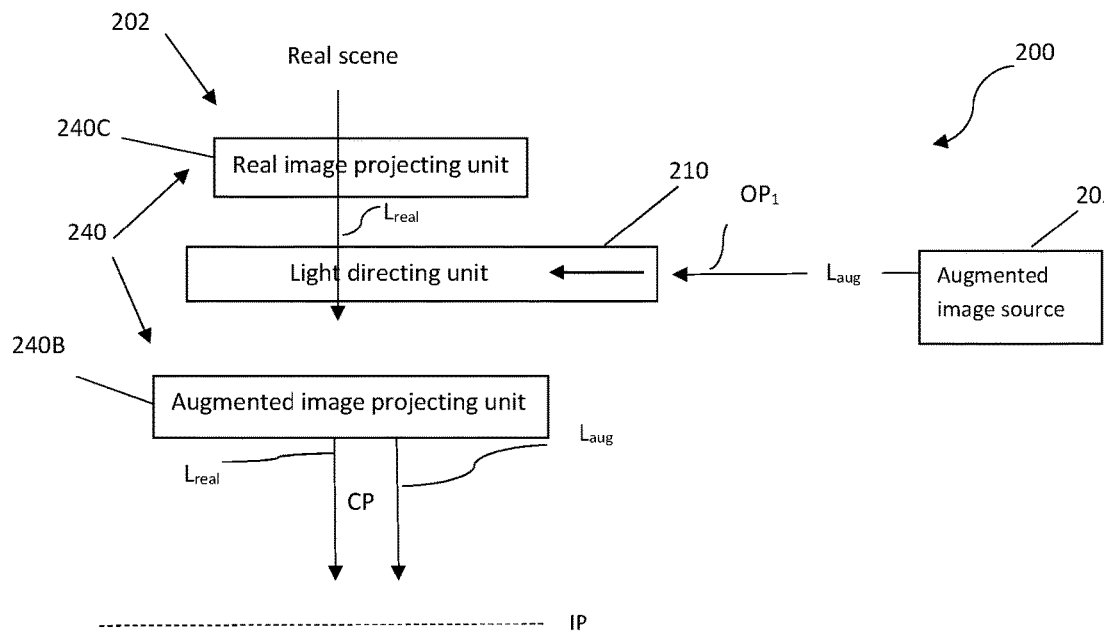

Reference is made to FIGS. 3A and 4A which illustrate, by way of block diagrams, two embodiments of an imaging system 200 for use in augmented reality applications, utilizing an optical system 202 of the invention. To facilitate understanding, the same reference numbers are used for identifying components that are common in all the examples.

Generally, the augmented reality imaging system 200 includes such main parts (functional and structural parts) as an augmented image source 205, a light directing device 210, and a projecting optical device 240 configured and operable according to the invention. Common for all the configurations of system 200 is that the light directing device 210 is configured for directing input light, $L_{aug}$, indicative of an augmented image which is to be projected and input light, $L_{real}$, indicative of a real image of an external scene, to propagate in a general propagation direction to an imaging plane (i.e. to viewer's eyes). Such a light directing device 210 may have any suitable configuration defining one or more beam combining surfaces (e.g. partially reflective and/or diffractive surfaces), each for reflecting/diffracting augmented-image light, $L_{aug}$, and transmitting real-image light, $L_{real}$, to the imaging plane.

The projecting optical device 240 of the present invention has a fixed field of view (FOV) and has a plurality of different focal parameters at different regions of the device corresponding to different vision zones (at least first and second vision zones) within the FOV. Typically, such at least first and second vision zones are constituted by at least far and near vision zones.

It should be understood that, for the purposes of the present application, different vision zones are physical zones/regions of the device 240 corresponding to different focal parameters thereof in its FOV. These regions of the device 240 are regions of intersection with the observer/viewer's line of sight at different orientations thereof, when the observer/viewer is moving his pupils to observe differently distanced objects.

The projecting optical device 240 is configured such that each focal parameter thereof (corresponding region/zone) provides in-focus images, in the imaging plane IP, for the augmented-image light, $L_{aug}$. As for the real image of the scene, it is not affected by the projecting optical device 240, and therefore is observed by the viewer based in the viewer's vision. As will be exemplified further below, the viewer may or may not use his spectacles or contact lenses, and his vision is thus defined accordingly. In other words, each focal parameter of the device 240, and a respective zone/region of the device, defines a different focus for the augmented image. Generally, the projecting optical device 240 is configured to affect light, $L_{aug}$, indicative of the augmented image. Thus, for example, images of far and near distanced objects in the augmented image are affected by respective different focal parameters (e.g. optical power) of the projecting optical device 240.

Referring to the embodiment of FIG. 3A, the projecting optical device 240 comprises an augmented image projecting unit 240A located in an optical path $OP_1$ of light $L_{aug}$ propagating from the augmented image source 205 towards the light directing device 210. Accordingly, the projecting optical device 240 affects only propagation of the augmented-image light $L_{aug}$ prior to its interaction with the light directing device 210, while propagation of the real-image light $L_{real}$ remains unchanged. Thus, for example, the slanted augmented image may be produced as exemplified in FIG. 2B, while the real-world scene remains unaffected by the device 202.

As indicated above, the projecting optical device 240 is configured to have a plurality of different focal parameters across its field of view. These different focal parameters are associated with corresponding different vision zones which are different regions of the projecting optical device 240, which, when the system is in use (worn by viewer), are aligned with different angular orientations of the user's line of sight when observing differently distanced objects.

Thus, collimated light $L_{aug}$ indicative of augmented image, created by the image source 205, interacts with (e.g. passes through) the augmented image projecting unit 240A at a certain region/zone thereof and undergoes respective focusing/convergence (defined by the focal parameter of said certain region/zone), and is then reflected by the partially reflective surface (light combining surface) of the light directing device 210 towards the projecting path CP to be focused on the imaging plane IP (viewer's eyes or eyebox). Concurrently, the real-image light $L_{real}$ propagating along path CP interacts with (e.g. passes through) the partially reflective surface of the light directing device 210 without being changed and continues to propagate in its original projecting path CP to be focused on the imaging plane IP (viewer's eyes).

It should be understood that, generally, the propagation paths of light parts $L_{aug}$ and $L_{real}$ are combined into the common output projecting path CP if said propagation paths of light parts $L_{aug}$ and $L_{real}$ correspond to the same focal distances. Thus, in the specific configuration of the projecting optical device 240 having only augmented image projecting unit 240A, as exemplified in FIG. 3A, the focal distance of the augmented-image light $L_{aug}$ is affected at the interaction zone with the augmented image projecting unit 240A to be properly modified. The operation of such augmented image projecting unit 240A will be described more specifically further below with reference to FIG. 3B.

Generally, common for all the embodiments of the invention, the projecting optical device 240 may include one or more lenses, e.g. a bifocal lens, trifocal lens, continuously changing focal distance lens (progressive lens), and/or any other optical device or assembly having varying focal parameters within its field of view. As a virtual object moves from an upper section of the FOV of the projecting optical device to a lower section of the FOV, its focal distance changes and the convergence of augmented image light rays changes accordingly. In the embodiment of FIG. 4A, the projecting optical device 240 is a two-part device including an augmented image projecting unit 240B and a real image projecting unit 240C accommodated at opposite sides, respectively, of the light directing device 210 in a spaced-apart parallel planes along a common optical axis. Each of the augmented image projecting unit 240B and the real image projecting unit 240C has the same fixed field of view FOV. The augmented image projecting unit 240B is accommodated at the front side of the light directing device 210 and the real image projecting optical unit 240C is accommodated at the back side of the light directing device 210 with respect to the imaging plane. Consequently, real image projecting unit 240C is located at the optical path of real-image light $L_{real}$, while the augmented image projecting unit 240B is located at the optical path of both real-image light $L_{real}$ and augmented-image light $L_{aug}$. The arrangement of the light directing device 210 and the projecting optical unit 240 is "static", in the meaning that the optical properties of this arrangement are fixed (i.e. field of view, optical power/focal profile across the FOV).

As described above, the light directing device 210 may have any suitable configuration having at least one beam combining surface (partially reflective/diffractive surface) for directing the augmented- and real-image light parts incident thereon. For example, in the embodiment of FIG. 4A, the light directing device 210 is configured as an optically transmitting light-guiding optical element LOE having fully reflecting inner major surfaces for directing/guiding augmented-image light $L_{aug}$ by total internal reflection and at least one partially-reflecting surface for reflecting light $L_{aug}$ towards the projecting path, and being transmitting for the external light $L_{real}$ to thereby transmit the real-image $L_{real}$ towards the viewer.

The need for the augmented image projecting unit 240B (as well as unit 240A described above with reference to FIG. 3A) may be associated with the need for the "slanted" effect described above with reference to FIGS. 2A-2B. However, in the configuration of the augmented image projecting unit 240B being in the output path of the augmented-image light $L_{aug}$, such augmented image projecting unit 240B unavoidably affects also the real-image light $L_{real}$. To this, the real image projecting unit 240C is provided and is configured to compensate the effect of augmented image projecting unit 240B on the real-image light $L_{real}$.

More specifically, the augmented image projecting unit 240B and the real image projecting unit 240C have the same FOV. Each of the augmented image projecting unit 240B and the real image projecting unit 240C is configured to have a plurality of different focal parameters corresponding to different regions/zones thereof within the field of view, and the units 240B and 240C are aligned in an opposite symmetric manner with respect to a plane of the light directing device 210. This means that optical power profile across the FOV (i.e. different regions having different focal parameters) of the augmented image projecting unit 240B is aligned in an opposite symmetric manner with the optical power profile of the real image projecting unit 240C. Such an alignment results in that real-image light $L_{real}$ while propagating in its original direction passes through unit 240C where it undergoes focal modification (in case projecting unit 240B applies defocusing, the projecting unit 240C applies a corresponding focusing effect) that will then be compensated by the real-image light $L_{real}$ passage through the augmented projecting unit 240B, which applies the effective (non-compensated) focal modification to the augmented-image light $L_{aug}$. Thus, the real image projecting unit 240C is utilized here as a compensating optical unit nullifying the optical effects of the augmented image projecting unit 240B on light $L_{real}$.

For example, the real and augmented image projecting units 240B and 240C may include progressive lenses (continuously varying focus across the FOV of the lens) which are aligned in an opposite symmetric manner as follows: One of these lenses may be a progressive lens with continuously increasing optical power from the lower segment of the lens, i.e. lower section of the FOV (typically used for observing near-distanced objects) towards the upper segment of the lens, i.e. upper section of the FOV (typically used for observing far-distanced objects), and the other lens with the same FOV is a progressive lens with continuously decreasing optical power from the lower segment of the lens towards the upper segment of the lens.

Figure 3B:
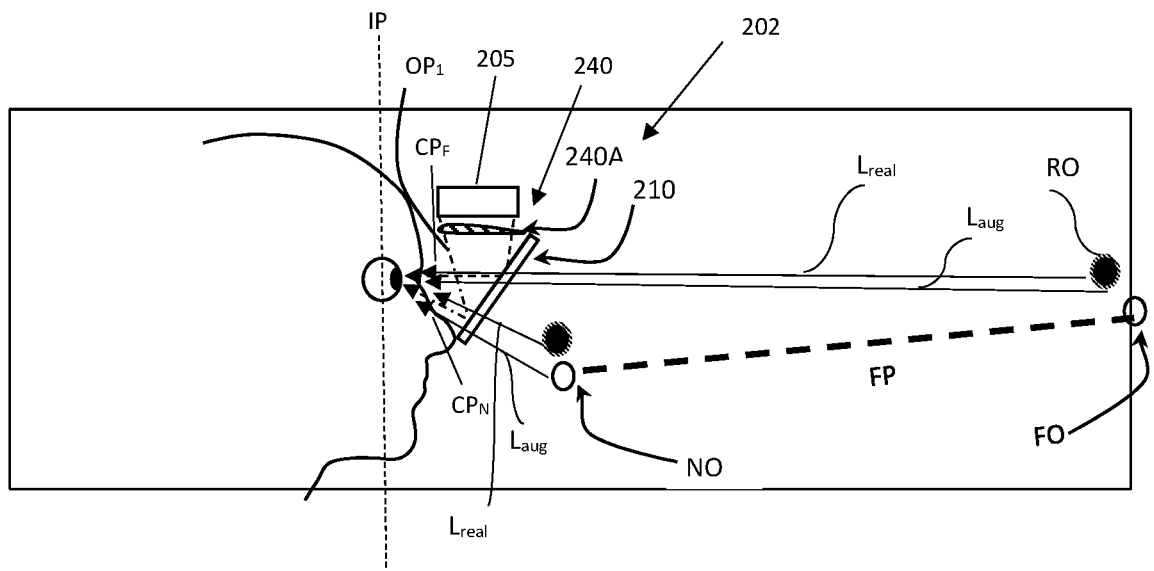
FIGS. 3B and 4B illustrate more specifically the system configurations of the embodiments of FIGS. 3A and 4A, respectively.

Referring now to FIG. 3B, operation of the system 200 of the embodiment of FIG. 3A is more specifically illustrated. In this embodiment, the projecting optical device 240 includes only the augmented image projecting unit 240A located in optical path $OP_1$ of augmented-image light $L_{aug}$ propagating towards the light directing device. Input augmented-image light $L_{aug}$ from the image source 205 interacts with (e.g. passes through) a region of the augmented image projecting unit 240A, which has certain fixed FOV and has different focal parameters at different regions thereof. In the present not limiting example, the augmented image projecting unit 240A has a lens with continuously varying focus, e.g. progressive lens. As indicated above, the principles of the invention are limited neither to the use of progressive lens nor to any other configuration of continuously varying focus. The convergence of the augmented-image light $L_{aug}$ propagation is modified by interaction with the region of the lens in accordance with the focal parameter at said region. The so-modified augmented-image light $L_{aug}$ propagating with said convergence is incident onto the light combining surface of the light directing device 210, which directs this light to the user's eyes (image plane). Thus, the augmented-image light interaction with each of different regions of the lens 240A having different focal parameter provides appearance of the respective augmented object/feature at a different virtual distance from the image plane, presenting virtual object/feature located closer or farer from the viewer.

As shown in the figure, the modification of the convergence of the augmented-image light $L_{aug}$ by interaction thereof with the different regions of the lens having different focal parameters provides different appearance of the virtual object. In the present example, such different appearance is exemplified as appearance of the close and far distanced objects NO and FO, respectively, as being observed by the user.

As shown in FIG. 3B, the observer is looking through the light directing device 210 of the near eye display 200 and sees augmented-image light from virtual objects FO and NO. The augmented-image light passes through the lens 240A that changes the focus of the virtual image differently across the lens. Augmented image light interacting with a segment of the lens 240A having minimal negative optical power, provides the virtual object appearance as the far distanced object FO (for example at 6 meters). The augmented-image light interacting with a segment of the unit (e.g. lens) 240A having stronger negative optical power provides the virtual object appearance as the near distanced object NO (for example at 1 meter). A continuous focal change of the unit 240A generates continuous change in the distance of the appearance of virtual objects along the virtual focal plane FP.

Considering the example of continuously varying focus of the projecting optical device, it creates a virtual focal plane FP. In this connection, it should be understood that, generally, and this is common for all the embodiment of the invention, a virtual focal profile may or may not be continuous, e.g. it may be not continuous for a case of discrete regions of different focal parameters across the projecting optical device. In other words, the shape of the virtual focal profile corresponds to the focal/optical power profile across the FOV of the projecting optical device.

As also shown in the figure, the real-image light $L_{real}$ propagating from a real far object RO (for example 6 m), passes through the light combining surface of the light directing device 210 into the viewer's eye. Thus, in this example, the progressive lens 240A is introduced in the optical path of the augmented-image light $L_{aug}$ only, while the light $L_{real}$ from the real 'world' is not affected by the optics of the system.

It should be noted that, generally and common for all the embodiments, the implementation of the projecting optical device 240 into the system 200 can be done by modification of the system optics, by introducing the device 240 (or one or more of its lenses) internally, or by modification of the surface of the light directing device 210 (with minimal distortion to the 'world'). This will be described further below.

Thus, the projecting optical device 240A provides that the augmented-image light portions, having convergences corresponding to the near and far distanced virtual objects, are coupled out of the light directing unit 210, along different projecting paths $CP_N$ and $CP_F$ which are common paths for the real image light originated at near and far distanced real objects RO.

Figure 4B:
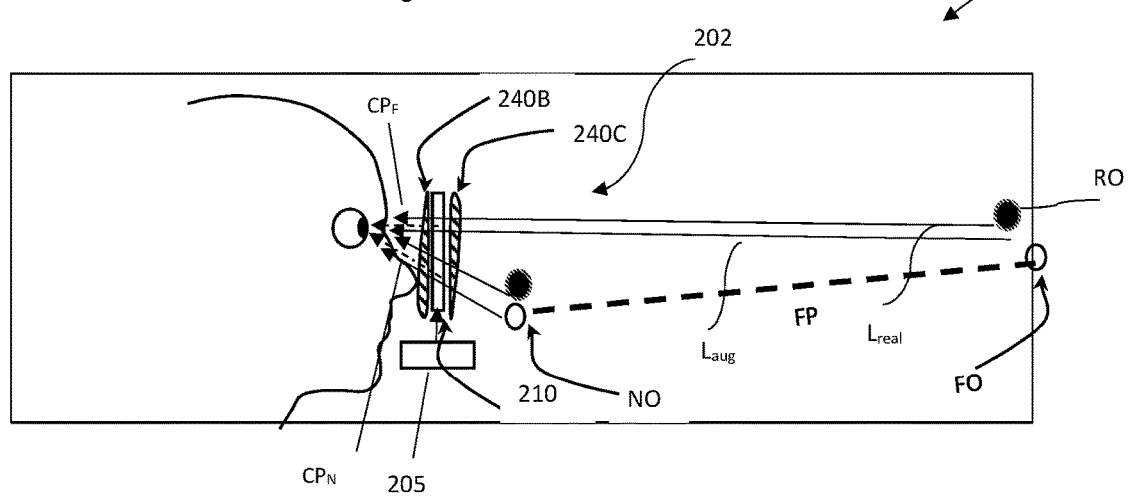

Referring to FIG. 4B, there is more specifically illustrated an example of the operation of the system of the embodiment of FIG. 4A, where the projecting optical unit 240 includes an augmented image projecting unit 240B and a real image projecting unit 240C. The augmented image projecting unit 240B is located in the optical path of both the augmented-image light $L_{aug}$ and the real-image light $L_{real}$ being output from the light directing device 210. The light directing device 210 may be a light-transmitting waveguide guiding input augmented-image light $L_{aug}$ by total internal reflection from its major surfaces (as shown in FIG. 1) and coupling it out by reflection from partially reflective surface. This is a light combining surface which transmits the real-image light $L_{real}$. The real-image projecting unit 240C is located in the optical path of real image light $L_{real}$.

In this specific but not limiting example, the projecting units 240B and 240C are in the form of opposite symmetric progressive lenses. As described above, it should be understood that, generally, the projecting units have opposite symmetric focal/optical power profiles across the identical fields of view, and these profiles may correspond to continuous variation of focus or discrete regions of different foci.

The observer is looking through the optical system 202 of a near eye display system 200 and sees light from virtual objects, being far and near distanced objects FO and NO in this example. To this end, the augmented image projecting unit 240B (e.g. progressive lens) provides that interaction of light $L_{aug}$ and light $L_{real}$ with the same region of the lens induces respective convergence on both of these light portions. More specifically, the upper segment of the lens 240B (the upper section of the FOV) applies minimal negative optical power to the interacting light, and accordingly the respective virtual image appears to originate from far distanced object FO (for example at 6 meters). The lower segment of the lens 240B (lower section of the FOV) introduces stronger negative optical power to the virtual image light, and thus the virtual image will appear to originate from a near distanced object NO (for example at 1 meter). A continuous focal change of the lens 240B would generate continuous change in virtual focal plane FO. As described above, generally, the shape of the virtual focal profile corresponds to the focal/optical power profile across the FOV of the projecting optical device 240.

In this configuration, the real image light experiences the same focal change (convergence change) by the augmented projecting unit 240B as the augmented image light. However, such change is not needed for the real image light. Therefore, the compensating real image projecting unit 240C is provided being configured as described above. The real image associated progressive lens 240C is placed adjacent and on the opposite side of light directing device 210 and is designed to have the opposite optical power profile of lens 240B. This way real 'world' objects will not be affected by the system.

Figure 5:
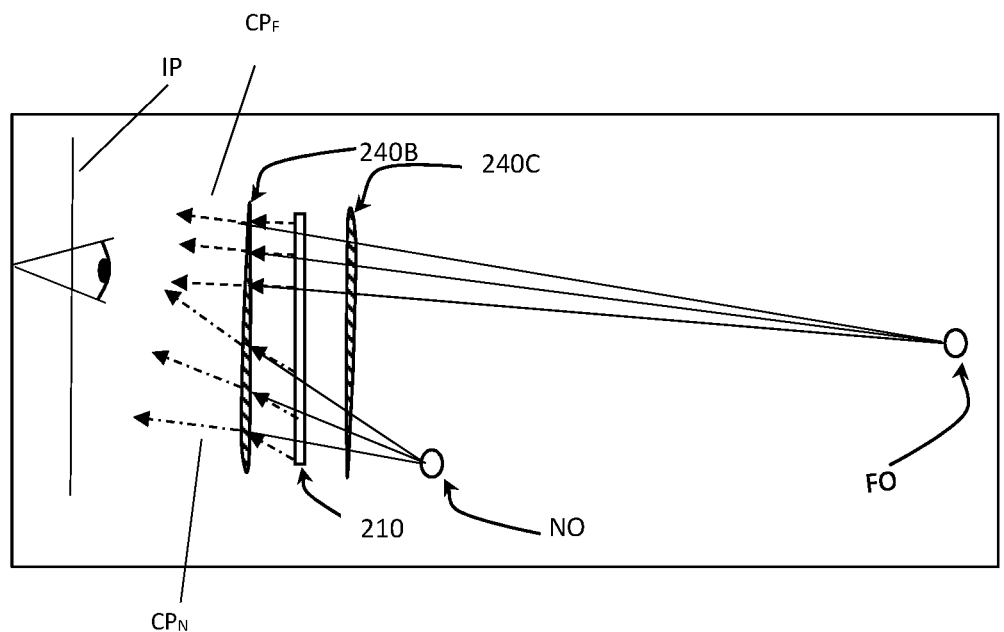
FIGS. 5 and 6 more specifically illustrate the light propagation schemes affected by, respectively, the augmented image projecting unit and the real image projecting unit in the system configuration of FIG. 4A.
Figure 6:
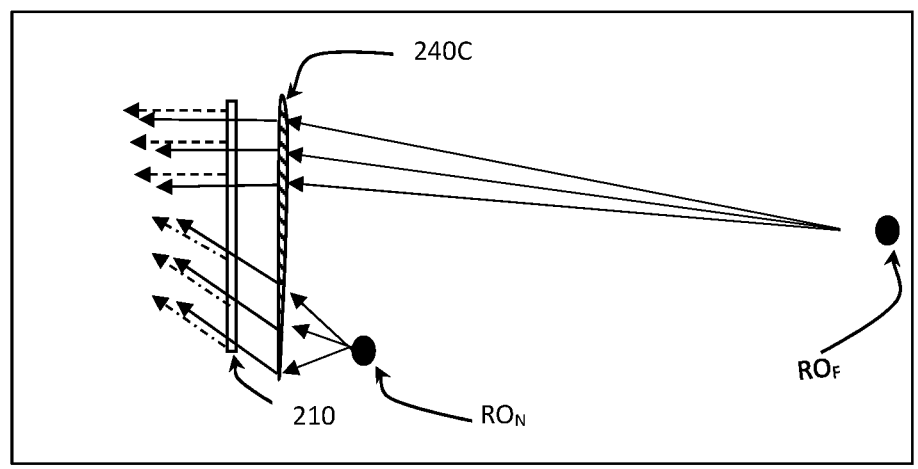

Reference is made to FIGS. 5 and 6 which more specifically illustrate the light propagation schemes affected by, respectively, the augmented image projecting unit and the real image projecting unit in the system configuration of FIG. 4A.

As shown in FIG. 5, the waveguide of the light directing device 210 outputs parallel light beams of the augmented image light $L_{aug}$ for each of two virtual images associated with objects NO and FO. As this light passes the augmented image projecting unit, which is a progressive diverging lens 240B in this example, the light at different interaction locations/regions of the lens 240B experiences different amount of divergence. Consequently, the two virtual objects FO and NO appear to be at different virtual distances. Thus, the so modified augmented image light rays arrive at the image plane, i.e. the location in space where observer eye will experience the designed performance. It should be noted that points FO and NO are only an example, while actually a continuous virtual focal plane or any other discrete focal profile (of a bifocal lens for example) can be created by the augmented image projecting unit 240B. The orientation of the virtual focal profile can be other than top down. It can also be side oriented.

The optical scheme for the real image light propagation is shown in FIG. 6. The light rays from real far and near objects $RO_F$ and $RO_N$ are incident on real image projecting unit 240C (varying focal lens). The different regions of the lens 240C having different focal parameters, with which the far- and near-object associated light rays interact, apply respective different focal changes on these light rays, which then pass through the waveguide 210. This way the real image light rays for the predefined distance $RO_N$ and $RO_F$ and the augmented image light rays emerging from the waveguide 210 are all collimated (focused to infinity), and thereby correlated. Although not specifically shown in the figure, it should be understood that all rays, those of real-image and augmented-image light may then pass through the lens 240B to generate the virtual image plane.

Figure 7:
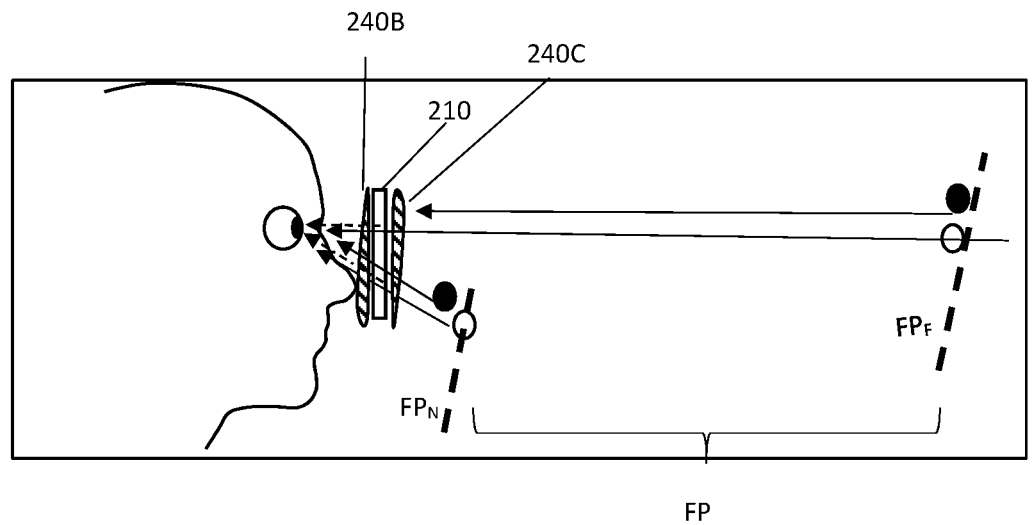
FIG. 7 exemplify the light propagation scheme affected by the augmented image projecting unit and real image projecting unit in the system configuration of FIG. 4A, where these units are implemented as bi-focal lenses.

FIG. 7 exemplifies the operation of the optical system of the invention utilizing a bifocal configuration of the projecting optical device 240 including the augmented image projecting unit (bifocal lens) 240B and real image projecting unit (opposite bifocal lens) 240C configured and arranged as described above. As shown, in this configuration the focal profile FP is in the form of discrete focal distances/positions $FP_F$ and $FP_N$ to generate distinct two separate virtual images. The upper section of the FOV generates focal position $FP_F$ and the lower section generates focal position $FP_N$. In a similar way, trifocal lenses, as well as any other discrete focal values' lenses can be used generating corresponding discrete-values focal profile.

Figure 8:
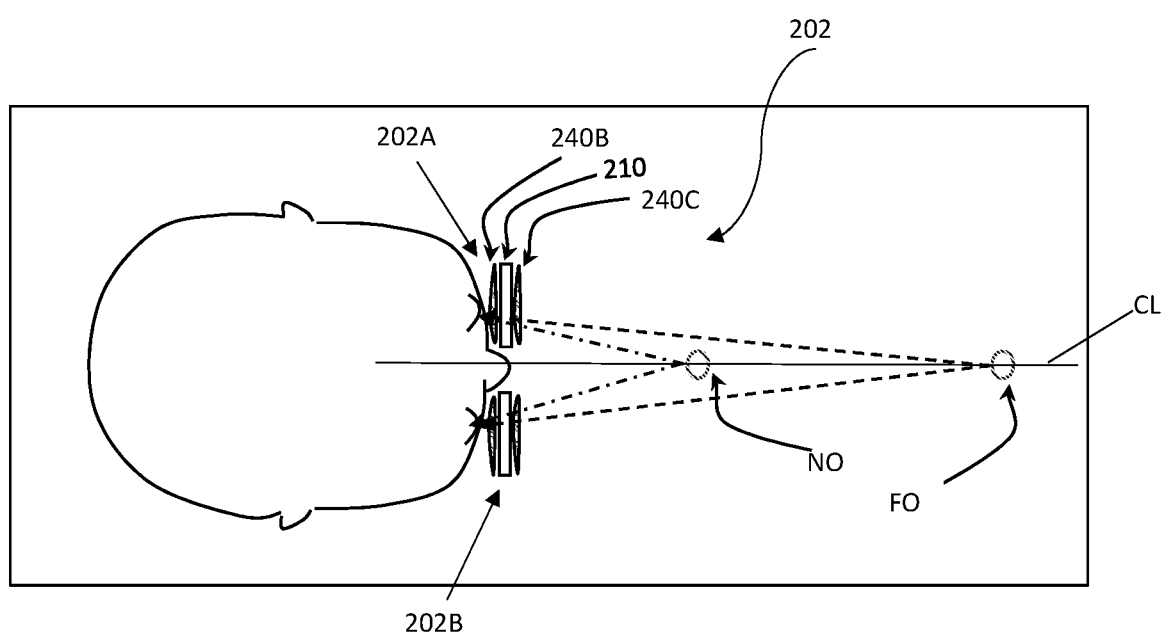
FIG. 8 illustrates the operation of a two eye display system with convergence utilizing the optical systems of the embodiment of FIG. 4A.

FIG. 8 illustrates, in a self-explanatory manner the optical system 202 configurations for use in a two-eye display system. The system 202 includes two similar units 202A and 202B. Each such unit is configured as described above implementing the embodiment of FIG. 4A. It should, however, be understood that the embodiment of FIG. 3A can be used, as well as another embodiment described below with reference to FIG. 11 can be used.

It should be understood that the projecting optical devices 240 in the units 202A and 202B are configured in opposite symmetric manner with respect to a central line CL between them parallel to their optical axes. This provides that, for each focal parameter, virtual objects created by the units 202A and 202B coincide in space. This is exemplified in the figure for virtual objects NO and FO. The progressive change in focal distances of virtual objects is accompanied by continuous change in convergence of the augmented image light rays being output of the augmented image projecting unit. It should be noted that, in some cases, the convergence is designed (i.e. the respective lenses are configured) to be less then nominal for focus in order to maintain margins for different eye distance of observers.

Figure 9:
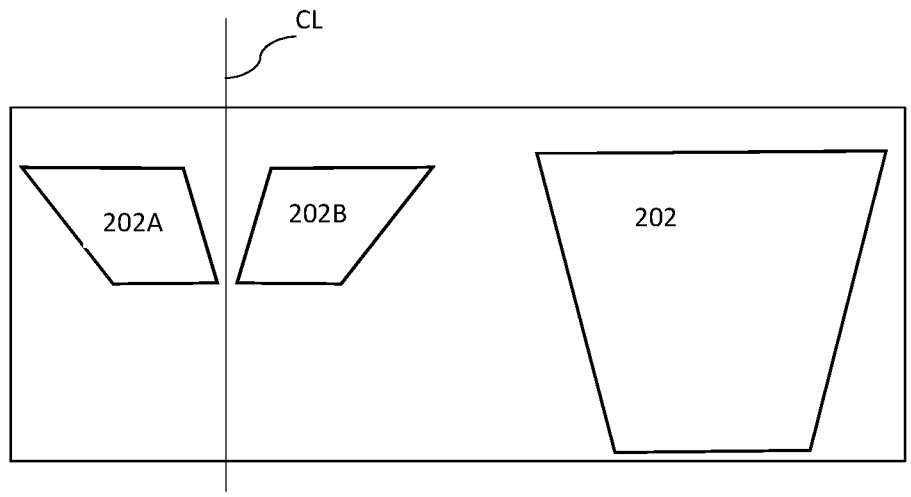
FIG. 9 exemplifies FOVs for eye-box of a non-symmetric shape.

FIG. 9 shows some examples for the shape/geometry of the elements of the optical system 202 in the augmented reality applications. As shown, the eye boxes (for left and right eyes) have an opposite symmetric shapes with respect to the central line CL between them which in this illustration is perpendicular to their optical axes. Also, each of these optical elements can be of a non-symmetric shape, because short range observation mostly utilizes narrower FOV and eye tend to converge. As also shown in the figure, the same is relevant for a two-eye single eye box, where the FOV can be arranged as 'portrait'.

Figure 10A:
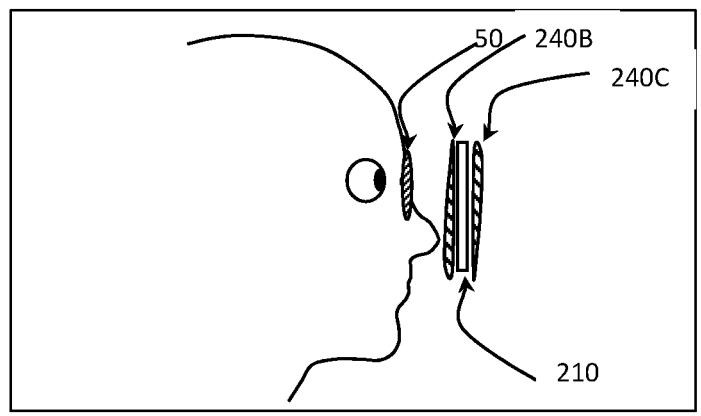
FIG. 10A exemplifies the use of the optical system of the embodiment of FIG. 4A in the progressive near eye display designed to be used in front of personal progressive lenses.

Reference is made to FIG. 10A, exemplifying the use of the optical system of the invention in front of personal progressive lenses (known in spectacles market) used by the observer. In this embodiment, the personal progressive lens 50 is closer than the optical system 202, i.e. is located downstream of the optical system 202 with respect to the light propagation to the user's eye. In the present non-limiting example, where the system has general configuration of FIG. 4A, the progressive lens 50 is located closer than the augmented image projecting unit 240B. Generally, the optical system of the invention can be conveniently used by progressive spectacle users. In two eye configuration, the convergence of the augmented image light rays can be performed according to the focal profile of personal progressive lens 50. However, since progressive spectacles introduce minimal convergence between both eyes or none at all (thereby generating accommodation-convergence inconsistency especially at close distance), the induced convergence (modification) of the virtual image light rays according to the present invention can be set to minimal or none at all. Thereby, the convergence of the virtual image light rays is set to generate accommodation-convergence consistency.

Figure 10B:
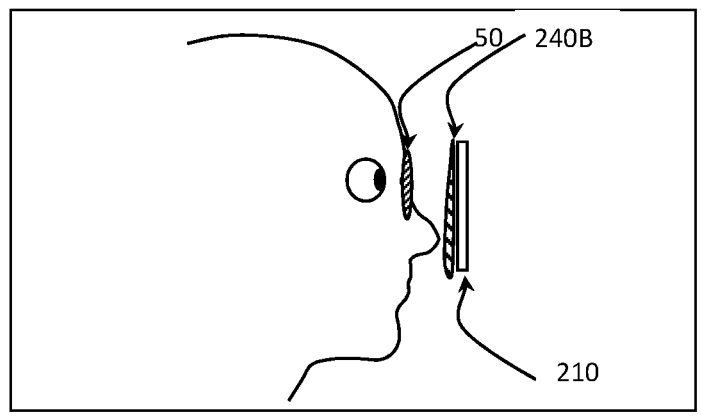
FIG. 10B illustrates yet another embodiment of the optical system of the invention for use in augmented reality system designed to be used in front of personal progressive lenses.

Referring to FIG. 10B, there is schematically illustrated optical system 202 of the invention having a somewhat different configuration, being configured to augmented reality system which is to be used by an observer having personal multifocal spectacles 50. In this embodiment, the system 202 includes a light directing unit 210, and a projecting optical device including only an augmented image projecting unit 240B located at the output of the light directing unit 210. Such configuration might be advantageous for the case where the observer prefers to use the near eye display while the virtual image as well as the 'world' are focused to infinity all across the FOV without the need to take of his spectacles. This is because in most cases spectacles also correct aberrations. In this embodiment, the augmented image projecting unit (e.g. multi-focal lens) 240B is configured to cancel/nullify the optical effect of progressive focus (generally, focal change) of the spectacles 50. Thus, the light projecting unit 240B has a predetermined optical power profile (defining the different focal parameters (across the FOV) configured in accordance with the predetermined optical power profile of a personal multi-focal lens of an observer, to be oppositely symmetric with respect to the optical axis of the system. Hence, for each of the regions of the unit 240B, interaction of a part of the augmented-image light and real-image light with this region induces a focal change on the interacting light, and this focal change compensates for a focal change which is successively induced by the light interaction with an aligned region of the multi-focal lens 50.

Figure 11:
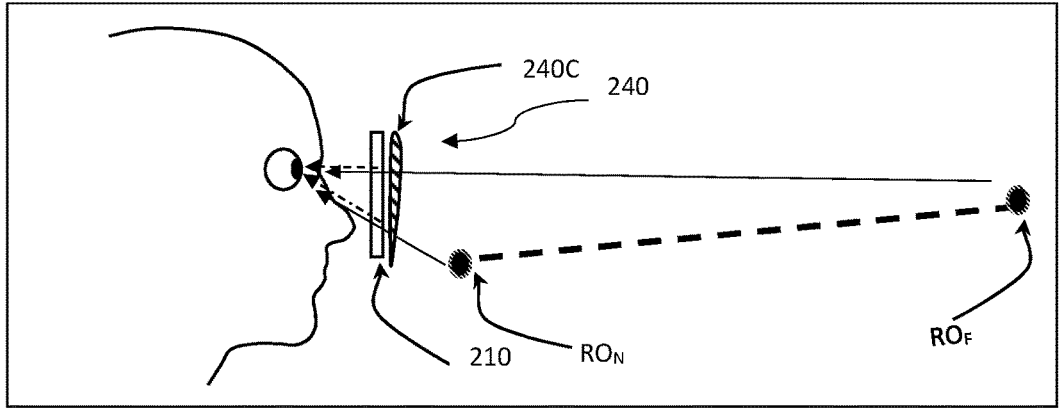
FIG. 11 schematically illustrates the configuration and operation of the optical system according to yet another embodiment of the invention, where the optical projecting device may include only the real image projecting unit.
Figure 12:
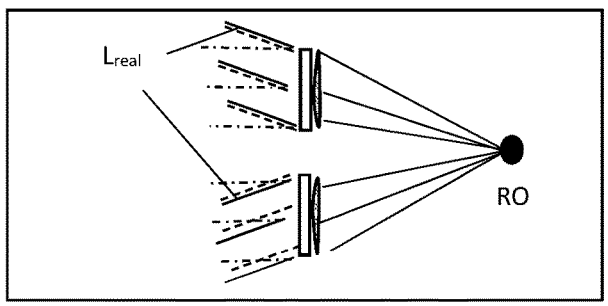
FIG. 12 more specifically illustrates the light propagation scheme produced by the real image projecting unit, in either one of the embodiments of FIG. 4A or FIG. 11 with various convergence of image from both eyes.

Reference is now made to FIG. 11 illustrating schematically an example of configuration and operation of an optical system 202 according to yet another embodiment of the present invention. In this embodiment, the system includes a light directing device 210 defining at least one light combining surface/plate for reflecting/diffracting and transmitting respectively augmented image light and real image light; and a projecting optical device 240 which may include only real image projecting unit 240C. As described above, in some cases, the real image projection is to be performed similar to that of a multi-focal lens (e.g. progressive lens), such that both the augmented image and the external world are focused to infinity in the upper segment/section of the FOV where the real objects are far $RO_F$ and in the lower segment/section of the FOV where real objects are typically near $RO_N$. This requires modification of light indicative of the real image being projected. In this configuration the observer sees the real and the virtual images focused to infinity FIG. 12 more specifically illustrates the light propagation scheme produced by the optical systems of the invention exemplified in FIG. 11. It should be noted that the variable compensation for real-image light convergence across the FOV might be difficult to achieve in progressive lenses. Element RO represent far-distanced real object that is imaged by progressive lens. The light rays $L_{real}$ (solid lines) are parallel for every eye related propagation path, but are not parallel between the eyes. A virtual image can be made electronically to have required light pattern (represented as dashed lines). This is convenient when observing simultaneously real and virtual objects. However, when observing virtual image only it will be more convenient to have convergence to fit the accommodation as presented by the dot-dash lines.

Figure 13:
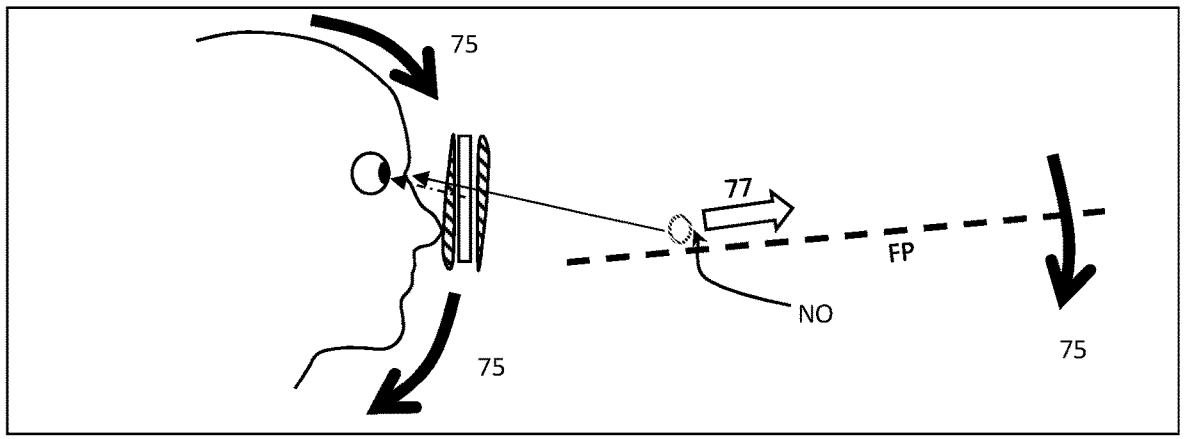
FIG. 13 more specifically illustrates the effect on light propagation produced by the projecting optical device in the embodiment of FIG. 4A or FIG. 10A.

FIG. 13 schematically illustrates the advantageous feature of the optical system of the invention. It should be understood that although this is exemplified with respect to the optical system configuration of FIGS. 4A and 4B, the same is true also for all the system configurations, e.g. the system configurations of the above-described FIGS. 3A-3B and 11, as well as the example described below with reference to FIG. 15. The observer, when using the near-eye display system incorporating the optical system of the invention, is moving his head with respect to the display system, as depicted by arrows 75. Accordingly, the virtual focal plane FP is being the path shown by arrow 75. However, the virtual image can be set electronically to maintain relative orientation in space, and appear to move up and further away in direction 77 along the focal plane FP. The system is configured to enable the user to change focus or virtual distance as required. Alternatively, the user can move the virtual object up in the field of view without the head movement. This will have the same result: the object will appear to move up and away along arrow 77. Generally, both of these methods can be used by the observer to change object distance and correlate it with real objects distance.

Figure 14A:
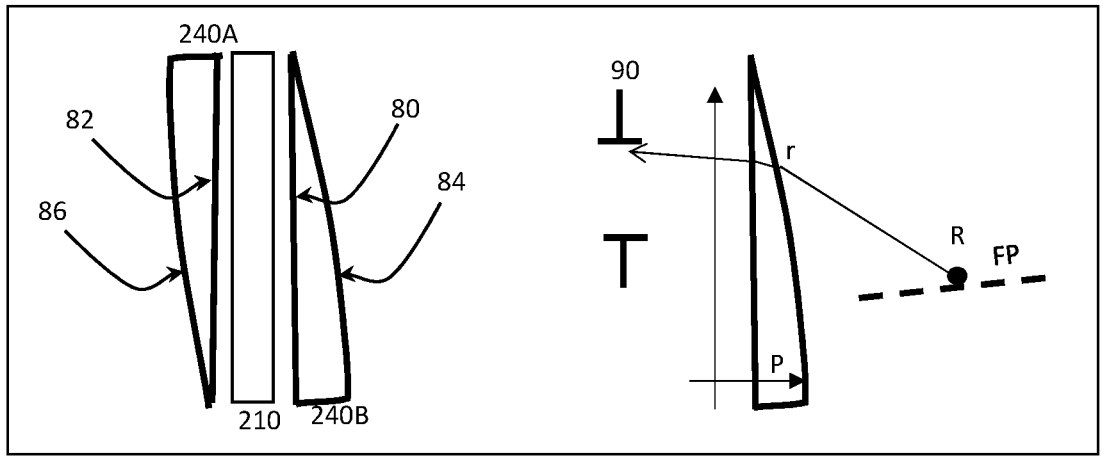
FIGS. 14A to 14C exemplify the configurations of lenses in the augmented image and real image projecting units.
Figure 14B:
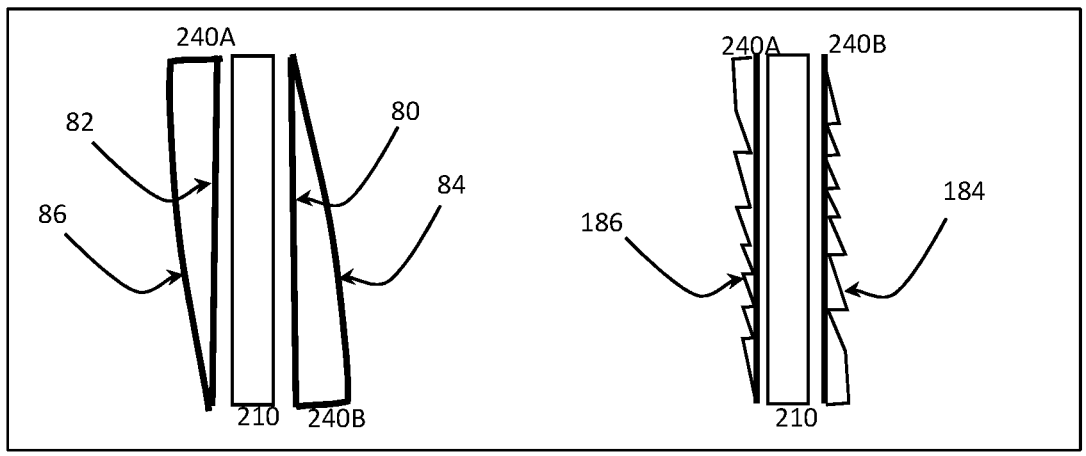
Figure 14C:
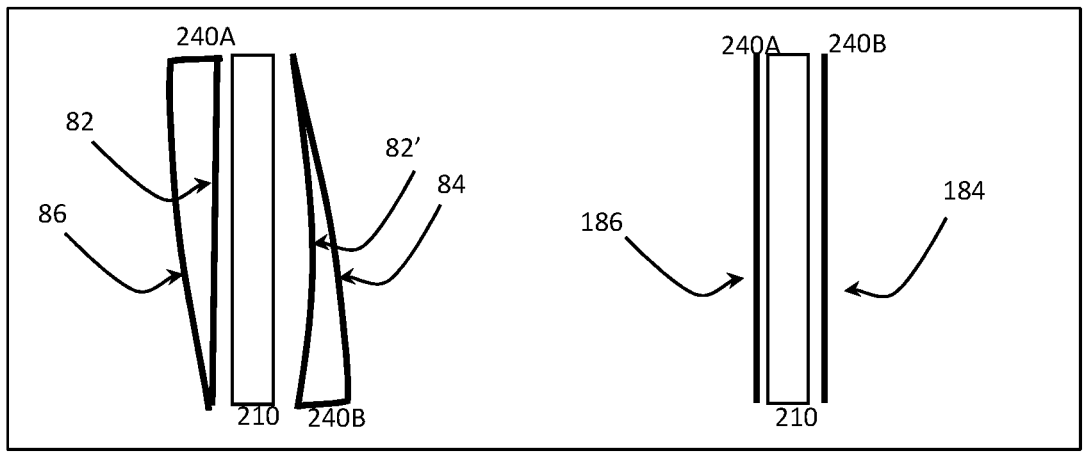

Reference is made to FIGS. 14A to 14C exemplifying some geometrical features of the projecting optical device, e.g. progressive lens(es). The design of a multifocal lens (e.g. progressive lens) is well known methodology. However, for the purposes of the present application, the multi-focal lens should preferably occupy a minimal volume of the optical system. This can be achieved if the lens back surface 80 is designed to be conformal with the adjacent outer surface of the light directing device (waveguide) 210. In most cases, this is a flat plane (as exemplified in FIGS. 14A-14B). For best optical performance, the opposite lens should also be adjacent and have a conformal back surface 82. This surface can be attached to the waveguide 210 as long as it maintains total internal reflection within the waveguide. These features, as well as various examples of the manufacturing technique to achieve these features, are described in the above-indicated WO 2016/103251 assigned to the assignee of the present application and also in a co-pending application No. PCT/2016/050523, both being incorporated herein by reference with respect to this aspect of the invention.

According to the present invention, the shape of surfaces 84 and 86 can be modified to generate the required progressive optical power. The design of these shapes may be based on weighted average.

As shown in FIG. 14C, the surface of the lens by which it faces the waveguide may not be planar. This is exemplified in the figure for surface 82' of one of the lenses. However, it should be understood that this feature can be used in any one of the above-described embodiments, for one or more of the lenses.

The method of optimization for the shape of the facing surfaces of the lenses can include various parameters, similar to that performed in progressive lens design for spectacles. The basic approach for deriving the outer surface of the lens is hereby described. However, it should be understood that other known suitable methods can be used.

According to the basic approach, the following parameters are used: r being the position on lens surface; R being the position on object real space to be collimated on the virtual focal plane FP; P being the height/position of lens surface designed to create wave-front from point R correlating wave-front from waveguide (plane-wave in most cases), and can be derived using optical simulation software; f being the weighting function depending on various parameters such as position of eye-box 90 constituting the eye pupil (for example rays outside eye-box are of no significance).

The profile P(r) of the lens surface 84 is therefore averaged:

$$P(r) = \frac{\int P(r, R) \times f(r, R) \times dR}{\int f(r, R) \times dR}$$

A more complex iteration can be used to optimize lens surfaces such as surfaces 86 with 84. All the surfaces/interfaces of the projecting optical device can also me optimized (e.g. surfaces 80, 82 (or 82'), 84 and 86).

As further exemplified in FIG. 14B, the optical lens to be used as the projecting optical unit in the system of the invention may be is based on Fresnel lens. As sown in the figure, surfaces 186 and 184 of such lens have same optical properties as those of surface 86 and 84 respectively in the above example of FIG. 14A. As known, the use of Fresnel lens provides for reducing weight and size of the optical system.

Figure 15:
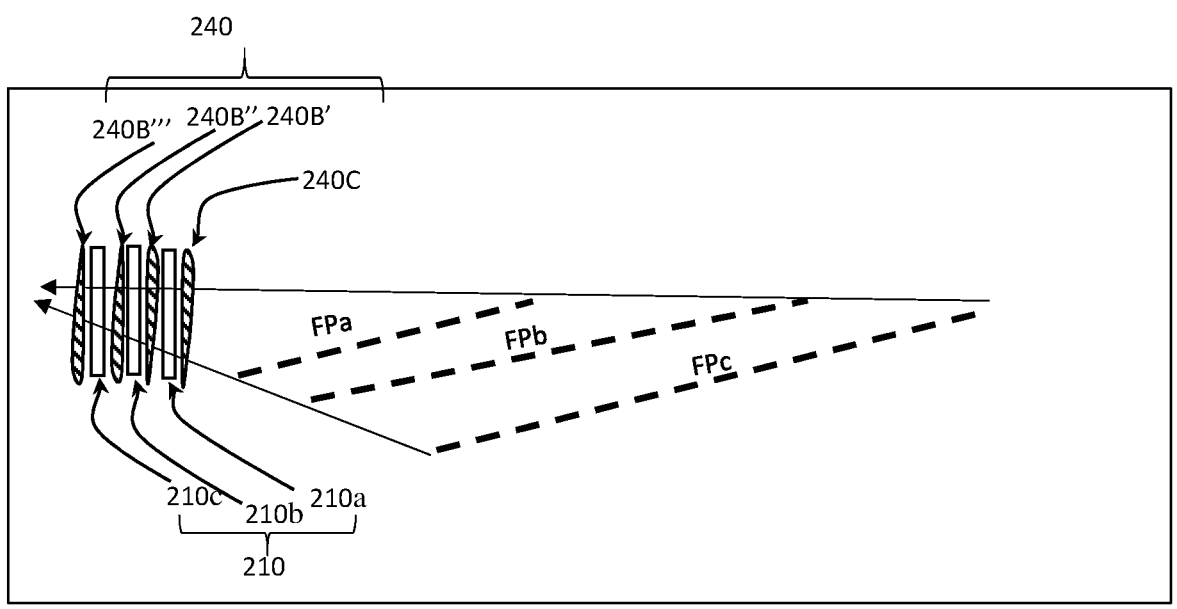
FIG. 15 schematically illustrates yet another example of the projecting optical device of the invention, in which both light directing device and light projecting device are configured as a multi-unit assembly.

FIG. 15 schematically illustrates a projecting optical device 240 configured according to yet another example of the invention. The device 240 of this example is configured generally similar to the embodiment of FIG. 4A, namely includes a light directing device 210 and image projecting device 240 in the optical path of both the augmented image light and the real image light. However, in this example, the light directing device 210 and the image projecting device 240 are configured as multi-unit devices/assemblies. More specifically, the light directing device 210 includes an array (generally at least two light directing units)—three such light directing units 210a, 210b, 210c being shown in the present example; and the light projecting device 240 includes an array of light projecting units—units 240B', 240B", 240B'", 240C in the present example. It should be understood that light projecting unit 240C is the only one which interacts only with the real-image light and does not interact with the augmented image light. Each light directing unit in the array is configured as described above, namely for guiding input augmented-image light towards a light output surface (light combining surface) and transmitting the real-image light to interact with the light output surface. The light directing units and light projecting units are located in a spaced-apart relationship along a common axis (optical axis of the system). Each light directing unit (generally at least one or at least some of them) is enclosed between two of the light projecting units. As shown in the figure, light directing unit 210a is located between light projecting units 240C and 240B'; light directing unit 210b is located between light projecting units 240B' and 240B"; light directing unit 210c is located between light projecting units 240B" and 240B"'.

Hence, the real-image light successively propagates through (interacts with) all these units. As for the light directing units, each of them is selectively operated. More specifically, each light directing unit may be operated independently: Each light directing unit may be associated with its own augmented image source, in which case the multiple image sources may be selectively operated one-by-one, or at least some of them or all of them are operated concurrently. Alternatively, at least some of the light directing units or all of them may be associated with a common image source. In the latter case, the common image source is selectively switchable between different operational modes to direct augmented-image light to different one or more of the light directing units. The selection of the light directing unit and/or image source to be operated in a certain imaging session can be implemented sequentially (the system scans the light directing units and injects the appropriate augmented image to each one); and/or using an eye tracker based system (the system identifies, using an eye tracker, where the observer is looking (i.e. orientation of the line of sight) and injects the image to the appropriate waveguide considering the virtual image focus at that region).

Each of the light projecting units 210a, 210b, 210c has an optical profile (different focal parameters across the FOV) such that, depending on the light directing unit(s) being selected for operation in the imaging session, the respective light projecting units (i.e. those with which both the augmented-image light and real-image light interact) affect light propagation through the system. To this end, the optical profiles of the light projecting units 240B', 240B", 240B"', 240C are configured such that interaction of the augmented-image light with the respective light projecting units provides a desired effect (focal distance change), while interaction of the real-image light with the respective light projecting units on its way through the system does not induce any focal distance change.

Thus, in the example of FIG. 15, light directing units (waveguides) 210a, 210b, 210c form together the light directing device 210, and light projecting units (lenses having different focal parameters/optical power profiles across the fixed FOV) 240B', 240B", 240B"', 240C form together the optical projecting device 240. The combination of some of the units of the optical projecting device 240 forming the above-described augmented image projecting device and real image projecting device may be different in various imaging sessions. Here, at least two of the lenses are progressive lenses. Thus, a plurality of virtual focal planes FPa, FPb and FPc may be generated by the light projecting units operating as the augmented image projecting units and the waveguides, and the real-image projecting unit(s) (lens(es)), e.g. 240C, compensate(s) for real world aberrations. The orientation of virtual focal planes FPa, FPb and FPc can be arbitrarily modified according to the augmented image affecting progressive lenses 240B', 240B", 240B"'.

It should be understood that in the configuration of FIG. 15, the optical power profiles of all the light projecting units (lenses) are configured to provide that, selectively, optical effect (focal change) of one or more of them is compensated by one or more others, such that the lens(es) of the augmented image projecting unit in a specific session and lenses of the real image projecting unit in said session should be configured to compensate for the real-image light modification induced by the augmented image projecting unit.

More specifically, for the example of FIG. 15, lens 240C is configured to apply a compensating/opposite effect for the effect induced by lenses 240B', 240B" and 240B"' (for the case only waveguide 210a is in operation); lenses 240B' and 240C are configured to compensate for the real-image modification induced by lenses 240B" and 240B"' (e.g. only waveguide 210b is in operation), and lenses 240C, 240B', 240B" are configured to compensate for effect of lens 240B"' (only waveguide 210C is in operation).

Thus, the present invention provides a novel solution for configuration and operation of an optical system for use in an augmented reality system (such as see-through near-eye display system). The technique of the present invention enables the use of the optical system having a fixed field of view, while providing for required focal distance change across said field of view being applied to the augmented image light and/or real image light being projected onto the image plane (eyebox).

The invention claimed is:

1. A binocular augmented reality (AR) display for providing a projected image superimposed on a view of an external scene for viewing by eyes of a viewer, the binocular AR display comprising a right-eye display and a left-eye display each comprising:

(a) a light transmitting waveguide having a pair of parallel major external surfaces;

(b) an image projector configured to project image light corresponding to a collimated image, said image projector being optically coupled to said waveguide so as to introduce the image light into said waveguide so as to propagate by internal reflection at said major external surfaces;

(c) a coupling-out arrangement associated with a coupling-out region of said waveguide for progressively coupling out the image light towards the eye of the viewer, the coupled-out image light having a field of view including an upper region of the field of view and a lower region of the field of view; and (d) a multifocal real-image lens deployed between said waveguide and the external scene, said multifocal real-image lens having smoothly or discretely varying focus across the field of view such that said real-image lens has a positive optical power in a region aligned with a line of sight of the eye of the viewer when viewing the lower region of the field of view that is greater than an optical power of said real-image lens in a region aligned with a line of sight of the eye of the viewer when viewing the upper region of the field of view, wherein said image projectors of said right-eye display and said left-eye display project the projected image with a continuous change in convergence corresponding to an apparent change in a focal distance of the projected image between the upper region and the lower region of the field of view.

2. The binocular AR display of claim 1, wherein said real-image lens of each of said right-eye display and said left-eye display is a progressive lens having a smoothly varying focus across the field of view.

3. The binocular AR display of claim 1, wherein said real-image lens of each of said right-eye display and said left-eye display has discrete regions with differing focal parameters.

4. The binocular AR display of claim 1, wherein each of said right-eye display and said left-eye display further comprises a multifocal augmented-image lens deployed between said waveguide and the eye of the viewer, said multifocal augmented-image lens having smoothly or discretely varying focus across the field of view such that said augmented-image lens has a negative optical power in a region aligned with a line of sight of the eye of the viewer when viewing the lower region of the field of view that is greater than an optical power of said augmented-image lens in a region aligned with a line of sight of the eye of the viewer when viewing the upper region of the field of view.

5. The binocular AR display of claim 4, wherein each region of said augmented-image lens has an optical power which substantially cancels out with an optical power of a corresponding region of said varifocal or multifocal real-image lens.

6. The binocular AR display of claim 4, wherein said real-image lens and said augmented-image lens of each of said right-eye display and said left-eye display both have a smoothly varying focus across the field of view.

7. The AR display of claim 4, wherein said real-image lens and said augmented-image lens of each of said right-eye display and said left-eye display both have discrete regions with differing focal parameters.

* * * * *